US012712621B2

(12) United States Patent
Huang et al.

(10) Patent No.: US 12,712,621 B2
(45) Date of Patent: Aug. 18, 2026

(54) SPATIAL MULTIPLEXING BY BACKSCATTER DEVICE WITH MULTIPLE ANTENNAS

(71) Applicant: QUALCOMM Incorporated, San Diego, CA (US)

(72) Inventors: Min Huang, Beijing (CN); Chao Wei, Beijing (CN); Kangqi Liu, San Diego, CA (US); Mingxi Yin, Beijing (CN); Rui Hu, Beijing (CN); Hao Xu, Beijing (CN)

(73) Assignee: QUALCOMM Incorportated, San Diego, CA (US)

( * ) Notice: Subject to any disclaimer, the term of this patent is extended or adjusted under 35 U.S.C. 154(b) by 151 days.

(21) Appl. No.: 18/845,706

(22) PCT Filed: Jun. 6, 2022

(86) PCT No.: PCT/CN2022/097055

§ 371 (c)(1),
(2) Date: Sep. 10, 2024

(87) PCT Pub. No.: WO2023/236003

PCT Pub. Date: Dec. 14, 2023

(65) Prior Publication Data

US 2025/0192869 A1 Jun. 12, 2025

(51) Int. Cl.

| | |
|---|---|
| ***H04B 7/06*** | (2006.01) |
| ***H04B 7/22*** | (2006.01) |
| ***H04L 25/02*** | (2006.01) |
| ***H04W 72/044*** | (2023.01) |
| ***H04W 72/51*** | (2023.01) |

(52) U.S. Cl.

CPC ............. *H04B 7/0697* (2013.01); *H04B 7/22* (2013.01); *H04L 25/0204* (2013.01); *H04W 72/046* (2013.01); *H04W 72/51* (2023.01)

(58) Field of Classification Search

CPC .......... H04B 7/0697; H04B 7/22; H04B 5/79; H04B 5/45; H04L 25/0204; H04W 72/046; H04W 72/51

See application file for complete search history.

(56) References Cited

U.S. PATENT DOCUMENTS

| | | | | |
|---|---|---|---|---|
| 2019/0281574 | A1 | 9/2019 | Reial et al. | |
| 2021/0165092 | A1 * | 6/2021 | Hester .................. | G01S 13/758 |
| 2021/0344384 | A1 | 11/2021 | Dunna et al. | |
| 2024/0089725 | A1 * | 3/2024 | Wang ...................... | G01S 7/006 |

FOREIGN PATENT DOCUMENTS

| | | |
|---|---|---|
| WO | 2022000321 | 1/2022 |

OTHER PUBLICATIONS

Agilent Technologies: “MIMO OTA Open Issues List”, 3GPP TSG RAN4 Meeting #58, R4-111347, Taipei, Taiwan, Feb. 21-25, 2011, 4 Pages, The whole document.

International Search Report and Written Opinion—PCT/CN2022/097055—ISA/EPO—Dec. 21, 2022.

* cited by examiner

*Primary Examiner* — Sung S Ahn

(74) *Attorney, Agent, or Firm* — Dinsmore & Shohl LLP

(57) ABSTRACT

Certain aspects of the present disclosure provide techniques for wireless communications. One example method includes receiving, from a backscatter device, a spatial multiplexing capability report; transmitting, to the backscatter device, a reference signal reflection configuration; and transmitting, to the backscatter device, a transmission grant for a backscatter link.

41 Claims, 15 Drawing Sheets

One Frame (TDD)
10 ms
400
subframe
RB
slot
D D D D D D D D D D D D X U
OFDM symbol
slot
subcarrier
DMRS Rx
CSI-RS 430
PDCCH
SSS
PSS
PDSCH
PBCH
20 RBs
SS/PBCH Block
system bandwidth RBs One Frame (TDD)
10 ms
450
subframe
RB
slot
D X U U U U U U U U U U U U
OFDM symbol
slot
SRS
subcarrier
SRS Comb 0
SRS Comb 1
DMRS R

480
PUCCH
PUSCH

SPATIAL MULTIPLEXING BY BACKSCATTER DEVICE WITH MULTIPLE ANTENNAS

CROSS-REFERENCE TO RELATED APPLICATIONS

This application is a national stage application under 35 U.S.C. 371 of PCT/CN2022/097055, filed Jun. 6, 2022, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for spatially multiplexing data streams in a multi-antenna backscatter device.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a network entity. The method includes receiving, from a backscatter device, a spatial multiplexing capability report; transmitting, to the backscatter device, a reference signal reflection configuration; and transmitting, to the backscatter device, a transmission grant for a backscatter link.

Another aspect provides a method of wireless communications by a user equipment. The method includes receiving, from a backscatter device, a plurality of reflected reference signals; performing channel estimation based on the plurality of reflected reference signals; determining, based on the plurality of reflected reference signals, a number of spatial streams on the backscatter link between the backscatter device and the user equipment; receiving, from the backscatter device, one or more reflected radio waves using the determined number of spatial streams; and determining received data based on the one or more radio waves and the one or more reflected radio waves.

Another aspect provides a method of wireless communications by a backscatter device. The method includes transmitting, to a network entity, a spatial multiplexing capability report; receiving, from the network entity, a reference signal reflection configuration; receiving a plurality of reference signals; and transmitting reflected reference signals by selectively modulating the reference signals according to the reference signal reflection configuration.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
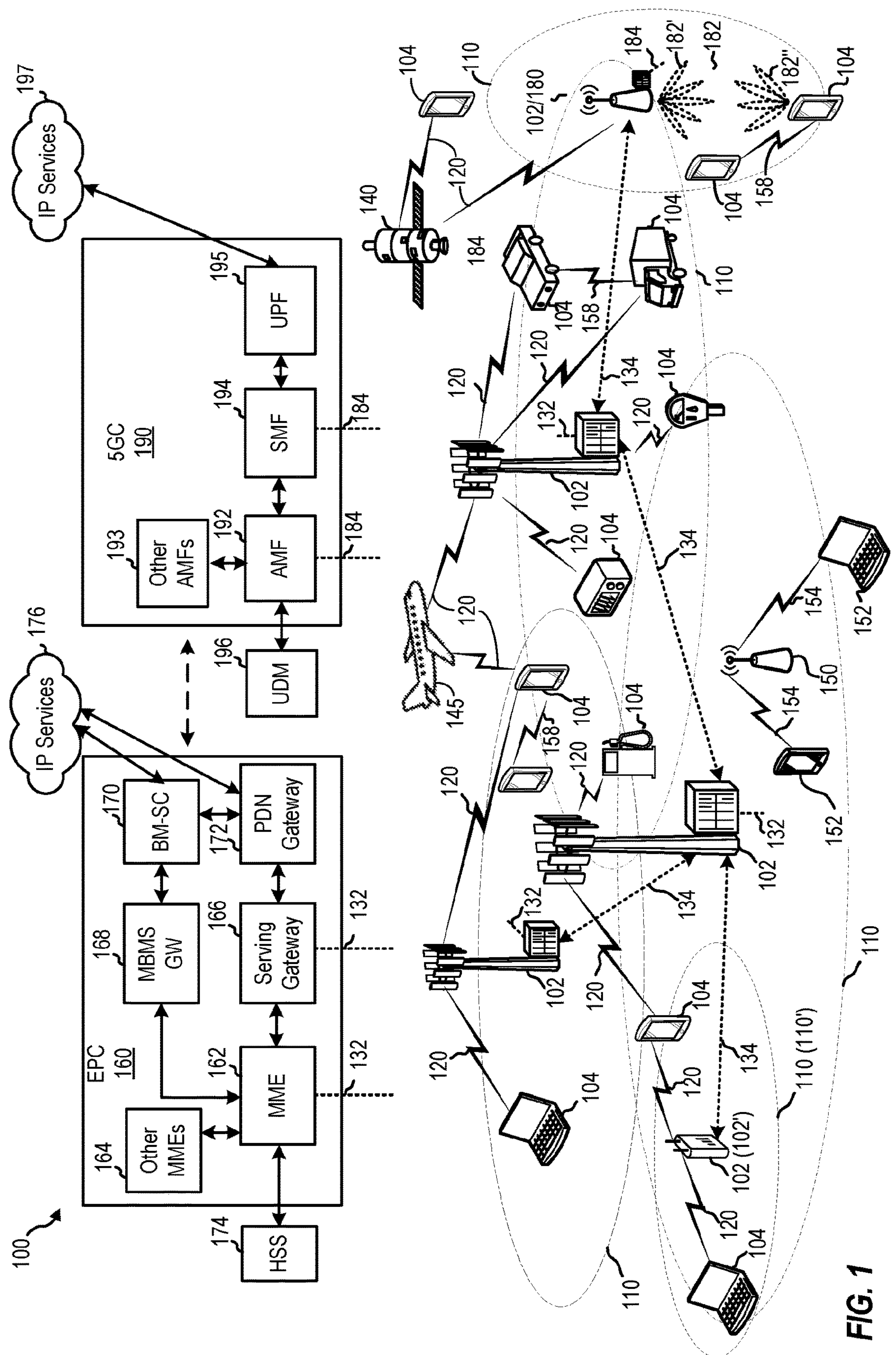
FIG. 1 depicts an example wireless communications network.

Aspects of the present disclosure provide apparatuses, methods, processing systems, and computer-readable mediums for spatial multiplexing by a backscatter device with multiple antennas, which beneficially enhances the spectrum efficiency in a wireless communications system, such as that described with respect to FIG. 1.

A backscatter device (e.g., a passive IoT device) is a type of user equipment that provides a low-cost and low-power solutions for many applications in a wireless communications system. For example, backscatter devices may be configured to harvest energy from a radio frequency (RF) source, rather than relying on a battery. In some aspects, in addition to harvesting power from RF sources, backscatter devices may accumulate energy from other direct energy sources, such as solar energy, in order to supplement its power demands.

Backscatter devices, such as passive IoT devices, have a variety of characteristics that make them uniquely suitable for many special applications. For example, backscatter devices may be very power efficient, sometimes requiring less than 0.1 mW of power to operate, which makes batteryless operation feasible. Further, their relatively simple architectures and, in some cases, lack of battery, mean that such devices can be small, lightweight, and easily installed or integrated in many types of environments or host devices. Generally speaking then, backscatter devices provide practical and necessary solutions to many networking applications that require, low-cost, small footprint, durable, maintenance-free, and long lifespan communications devices.

Backscatter devices can be beneficially deployed in many applications where low-cost wireless devices with inherent power harvesting capabilities overcome technical challenges with traditional low-powered user equipments. For example, backscatter devices, such as passive IoT devices, may be configured as long endurance industrial sensors, which mitigates the problems of replacing batteries in and around dangerous machinery.

Figure 5:
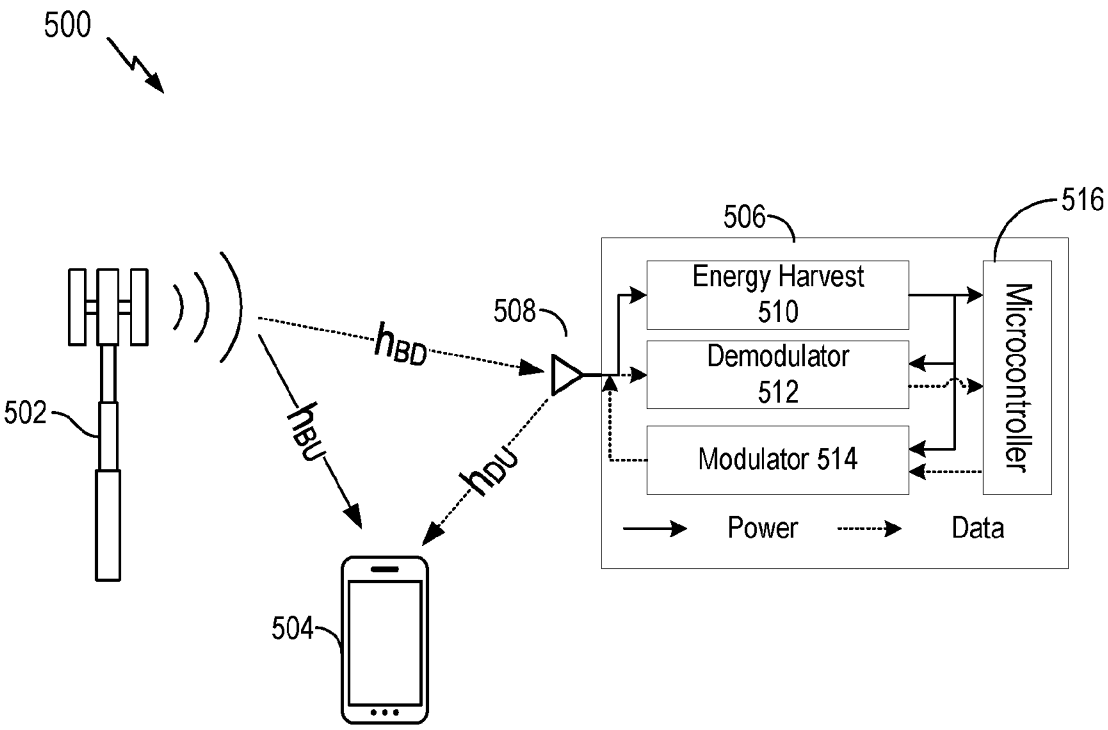
FIG. 5 depicts an example of a wireless communication system interacting with a backscatter device having a single antenna.

Emerging wireless communication networks (e.g., 5G and/or 6G) may support backscatter devices for expanded applications to reduce cost and to reduce environmental impact, such as by reducing size, raw materials, and power used by networked devices. However, conventional backscatter devices have only a single antenna, which limits the system to a single data stream for transmitting data within a wireless communication systems. FIG. 5 depicts an example of a conventional backscatter device with a single antenna.

To improve the capabilities and performance of conventional backscatter devices having a single antenna configuration, aspects described herein relate to backscatter devices configured to spatially multiplex a plurality of data streams using a plurality of antennas. For example, a backscatter device may employ two antennas to transmit two independent spatial data streams. The independent data streams may increase the throughput and/or robustness of transmissions by the multi-antenna backscatter device. In either case, the efficiency of the wireless communications system utilizing such devices is improved, for example, by reducing latency of data communications, improving power efficiency (e.g., by avoiding retransmission), and extending the range of environments in which backscatter devices may be deployed successfully (e.g., in more difficult radio environments). Thus, aspects described herein may enable backscatter devices to perform better in current and future wireless network implementations.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
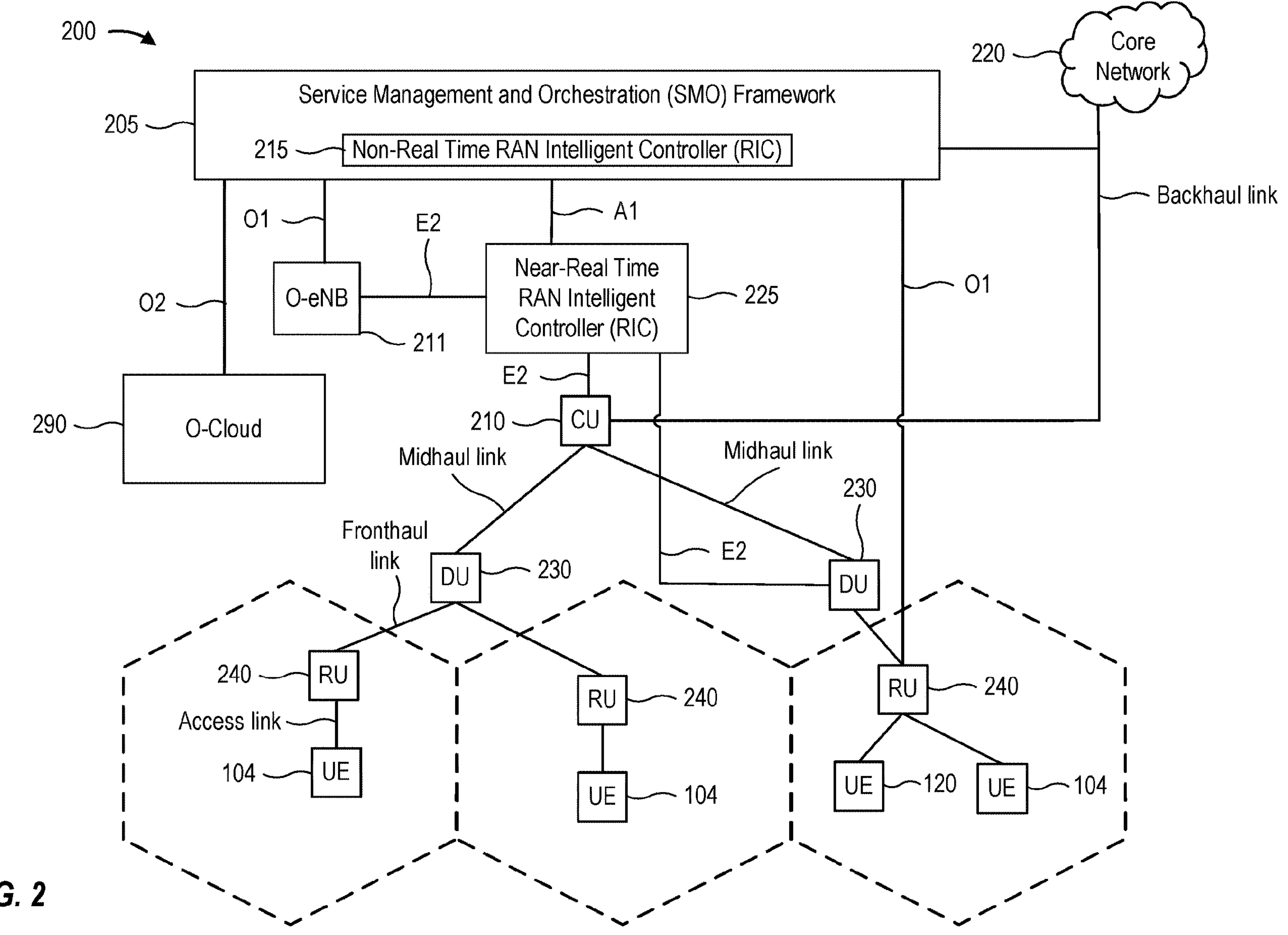
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210. DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
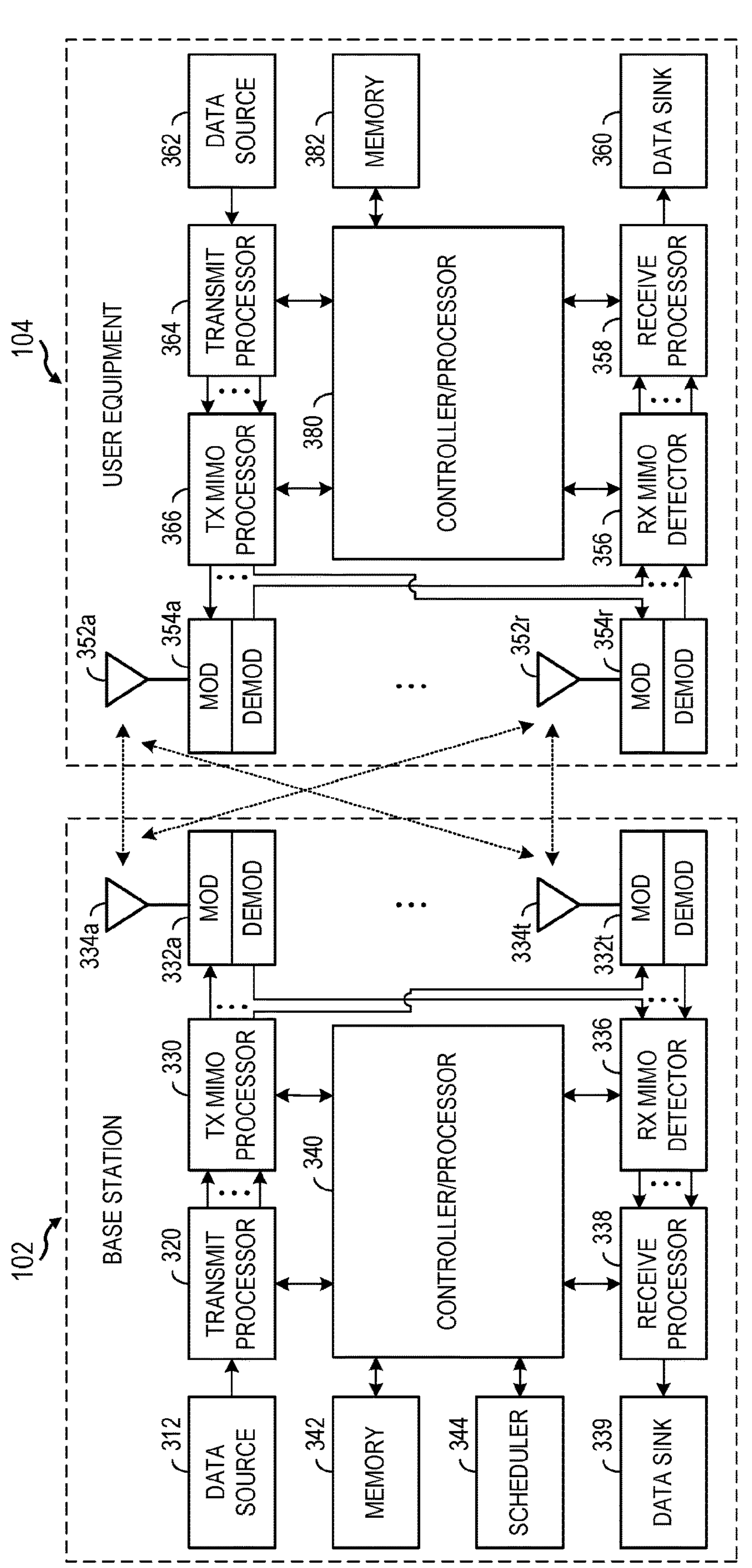
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
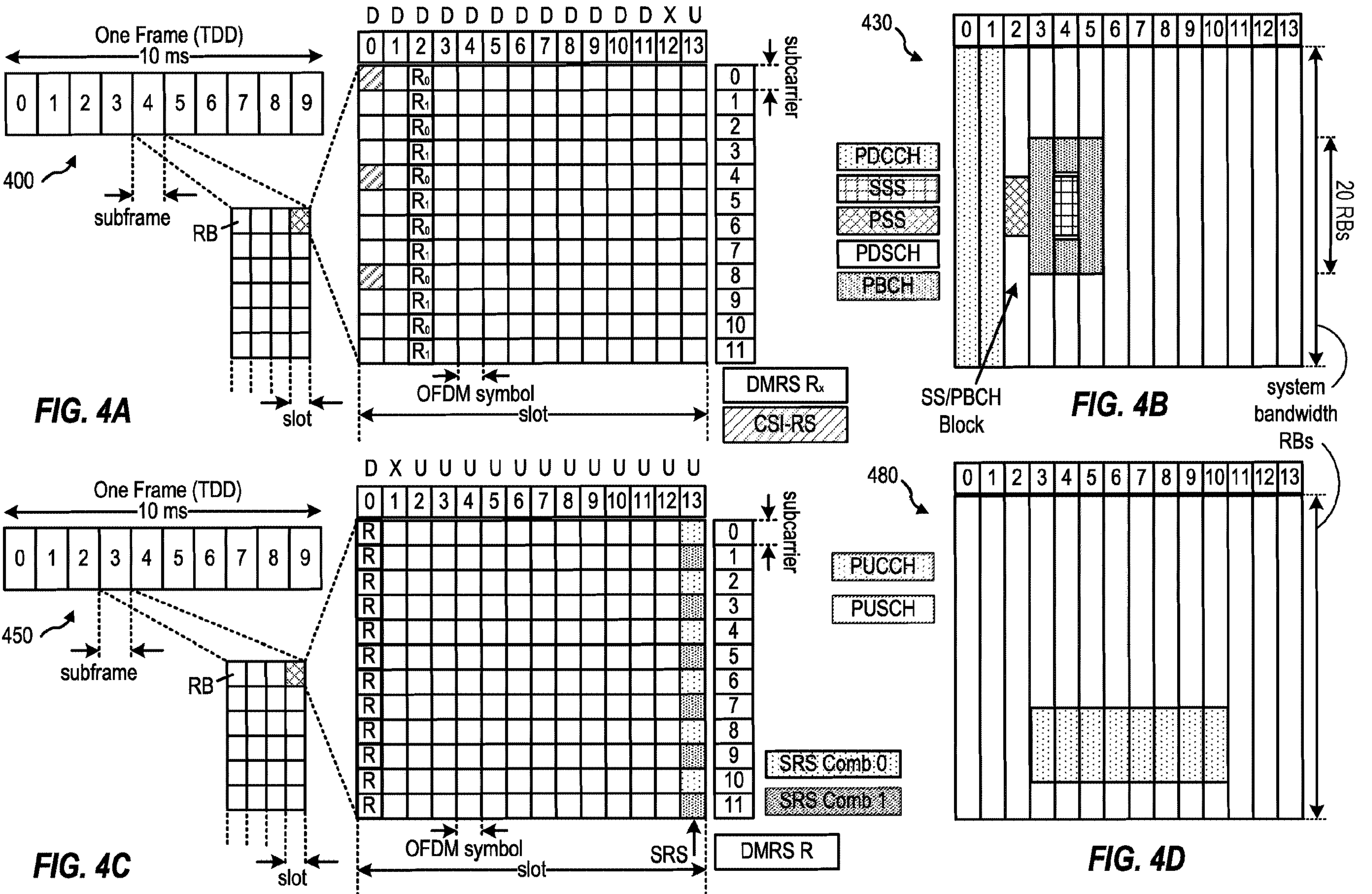
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to 24×15 kHz, where μ is the numerology 0 to 5. As such, the numerology μ=0 has a subcarrier spacing of 15 kHz and the numerology μ=5 has a subcarrier spacing of 480 KHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Spatial Multiplexing by Backscatter Device with Multiple Antennas FIG. 5 depicts an example of a wireless communication system interacting with a backscatter device having a single antenna.

In the depicted example, a base station (BS) 502, user equipment (UE) 504, and a backscatter device (BD) 506 are interacting to perform wireless communications. Specifically, BS 502 is configured as an RF source node transmitting a radio frequency (RF) wave (e.g., a reference signal or a data signal) to UE 504 and BD 506 such that UE 504 receives a direct link signal and BD 506 receives a backscatter link signal from BS 502.

Here, BS 502 acts as an RF energy source and transmits an energy harvest wave to BD 506 (e.g., a backscatter-based tag or sensor) that is equipped with internal components, including an antenna 508, energy harvest component 510, demodulator 512, modulator 514, and microcontroller 516 in this example. After the energy harvest wave is sufficiently accumulated by the energy harvest component 510, the microcontroller of BD 506 starts reflecting the energy harvest wave radiated to it via the single antenna 508, causing modulator 514 of BD 506 to switch on/off reflection that follows a pattern based on its transmission information bits. In this example, UE 504 acts as a "reader" and detects the reflection pattern to determine the backscatter communication information from BD 506. In this example, hu, hBp, hpy represent channel matrix vectors for the direct link channel status, backscatter incident link channel status, and the backscatter reflection link channel status, respectively.

While not depicted in FIG. 5, in another configuration, UE 504 may act as the RF source while BS 502 is the reader.

A common modulation method utilized that may be used by a backscatter device, such as BD 506, is amplitude shift keying (ASK), which involves a modulation scheme that switches on the reflection when transmitting information bit '1' and switches off the reflection when transmitting information bit '0'. In ASK, the RF source node may transmit a certain radio wave, e.g., a reference signal or a data signal (such as PDSCH), denoted as x(n). If the information bits of the backscatter device is represented by $s(n)\in\{0,1\}$, the received signal at reader is:

$$y(n)=(h_{BU}(n)+\sigma_f h_{BD}(n)h_{DU}(n)s(n))x(n)+\text{noise} \quad (1)$$

When s(n)=0, reflection is switched off at backscatter device, so the reader only receives direct link signal, determined by $$y(n)=h_{BU}(n)x(n)+\text{noise} \quad (2)$$

When s(n)=1, reflection is switched on at backscatter device, so the reader receives the superposition of both direct link signal and backscatter link signal, determined by:

$$y(n)=(h_{BU}(n)+\sigma_f h_{BD}(n)h_{DU}(n))x(n)+\text{noise} \quad (3)$$

where $\sigma_f$ denotes the reflection coefficient.

To receive the transmitted information bit by backscatter device, the reader first decodes x(n) based on the known $h_{BU}(n)$ by treating backscatter link signal as interference (if x is known reference signal, this step is removed); and then, the reader detects the existence of the term $\sigma_f h_{BD}(n)h_{DU}(n)$ x(n) by subtracting $h_{BU}(n)x(n)$ from y(n).

Figure 6A:
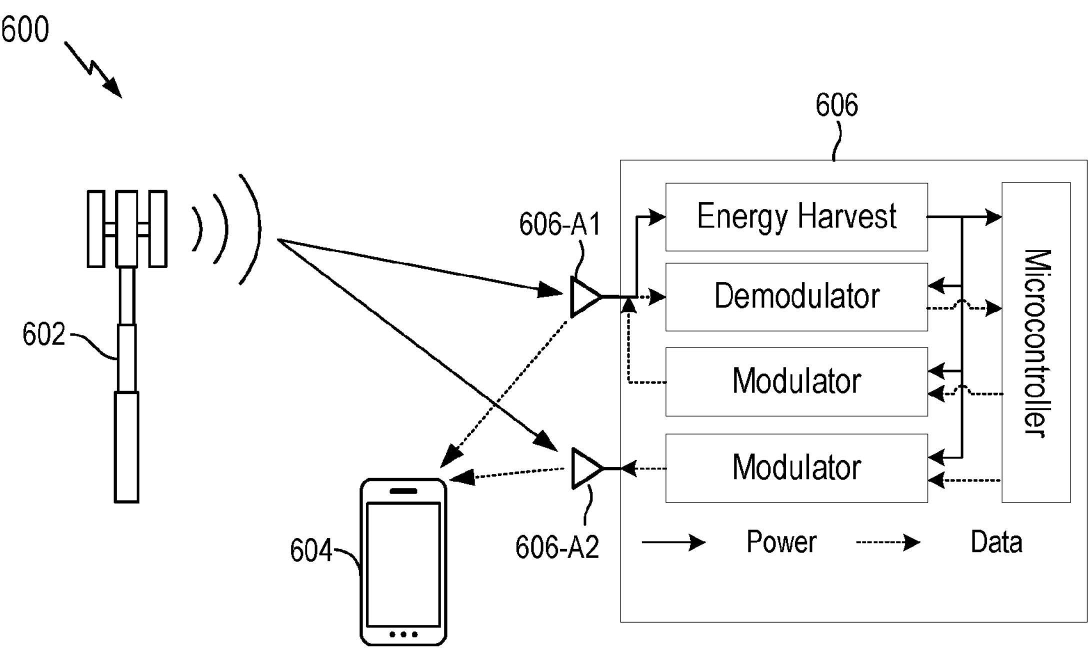
FIGS. 6A and 6B depict examples of multi-antenna backscatter devices spatially multiplexing data streams in a wireless communications system.
Figure 6B:
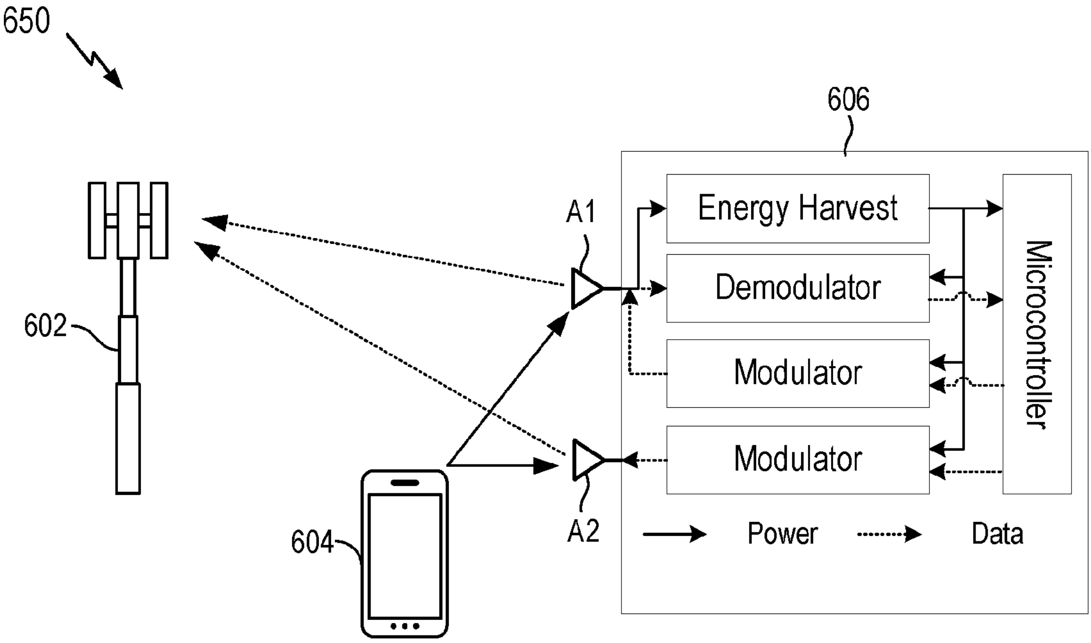

FIGS. 6A and 6B depict examples of multi-antenna backscatter devices (BDs) spatially multiplexing data streams in a wireless communications system.

As above, in one mode of operation. UE 604 may be configured as a reader for receiving data from BD 606 based on signals transmitted from BS 602, as shown in FIG. 6A. In another mode of operation, BS 602 is configured as the reader for receiving data from BD 606 signals transmitted from UE 604, as shown in FIG. 6B. Notably, in both the examples of FIGS. 6A and 6B, BD 606 spatially multiplexes data signals using its two antennas (606-A1 and 606-A2) and thus transmits two independent spatial data streams comprising data bits of information.

In aspects in which Amplitude Shift Key (ASK) modulation is used, an RF source node (BS 602 in FIG. 6A or UE 604 in FIG. 6B) may send a transmission grant signal to BD 606 for a backscatter link, so that BD 606 can start spatially multiplexing its transmission by switching on/off each antenna's reflection based on data bits when the BS 602 sends radio signals as shown in FIG. 6A. Depending on the mode of communication, either the UE 604 or BS 602 acting as the reader may detect which of the two antennas (606-A1 and 606-A2) switch on the radio signal based on the received signals, and then derive the data bits transmitted by BD 606, detecting a reflection pattern and thus acquiring the backscatter communication.

To support the reader's detection, the transmitter (BS 602 or UE 604) may send a reference signal reflection when each of the two antennas (606-A1 and 606-A2) of BD 606 switch on the reflection in turns, so that the reader can estimate a channel matrix of the backscatter link. Based on a rank of the backscatter link, BS 602 can determine whether one or two spatial streams are transmitted by BD 606, and then configure multiple transmission formats to BD 606. Some examples of transmission formats may include the selection of one or more antennas of the backscatter device for one or more spatial streams.

In one aspect, an RF source node transmits signal (e.g., continuous wave, sinewave, or other signals) for BD 606 to perform reflection based on its reference signal reflection configuration. Depending on the rank of the backscatter link, the network entity can determine whether one or two spatial streams are transmitted by BD 606. If it is determined that two spatial streams are transmitted by BD 606, reader with more than one receive (Rx) antenna may receive the signals as:

$$y=(\sigma_{f,1}h_1h_{0,1}x_1+\sigma_{f,2}h_2h_{0,2}x_2)\cdot s+z_{direct}+\text{noise} \quad (4)$$

where s is the signal transmitted by the RF source, which is common to the two antennas of BD 606, $\sigma_{f,i}$ is the reflection coefficient, $x_i \in \{0,1\}$, i=1 or 2, corresponding to the transmit data bit=1 or 0 at this antenna where each antenna of BD 606 has two states: reflection-on and reflection-off, $Z_{direct}$ is the received signal from direct link, which can be preconfigured or derived in advance, $h_{0,1}$ and $h_{0,2}$ are the channel response values from RF source node to antenna 1 and 2 of BD 606, respectively, and $h_1$ and $h_2$ are the channel response vectors from antenna 1 and 2 of BD 606 to the reader, respectively.

If $$\tilde{h}_1 = \sigma_{f,1} h_1 h_{0,1} s \text{ and } \tilde{h}_2 = \sigma_{f,2} h_2 h_{0,2} s,$$

then equation (1) may be rewritten as:

$$y = \tilde{h}_1 x_1 + \tilde{h}_2 x_2 + z_{direct} + \text{noise} = H \cdot \begin{bmatrix} x_1 \\ x_2 \end{bmatrix} + z_{direct} + \text{noise} \tag{5}$$

where $$H = [\tilde{h}_1, \tilde{h}_2].$$

Figure 7:
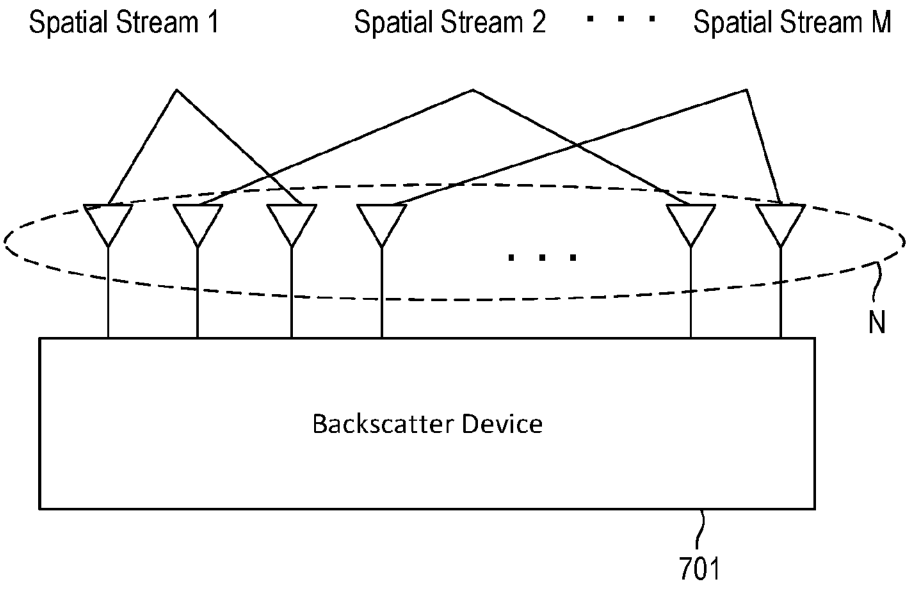
FIG. 7 depicts an antenna grouping technique by a network entity.

Though not depicted in FIGS. 6A and 6B, in other aspects, BD 606 may have more than two antennas. When the number of spatial streams is smaller than the number of BD's antennas, BS 602 may configure the antenna grouping information to BD 606. FIG. 7, described further below, depicts an example of grouping antennas for various spatial streams.

Further, while not depicted in FIGS. 6A and 6B, in other aspects, BD 606 may harvest energy from more than one of its antennas and may include multiple demodulators as well as modulators (e.g., one demodulator for each antenna, or set of antennas). The architecture of BD 606 in in FIGS. 6A and 6B is meant for conceptual clarity, and should not be considered limiting of the architecture of BD devices that may practice the aspects described herein.

Antenna Grouping

If a network entity (e.g., 602 in FIGS. 6A and 6B) determines that a BD (e.g., 606 in FIGS. 6A and 6B) is configured to or only capable of transmitting a single spatial stream, it may nevertheless be configured with transmission formats that leverage the two antennas via a transmission format. For example, in a single spatial stream transmission, a BD may be configured where (a) one data bit is modulated by switching on or off the reflection of antenna 1 (e.g., 606-A1 in FIGS. 6A and 6B); (b) one data bit is modulated by switching on or off the reflection of antenna 2 (606-A2 in FIGS. 6A and 6B); and (c) one data bit is modulated by the identical switching on or off the reflection of antenna 1 and antenna 2, which is generally equivalent to precoding/beamforming by two antennas with fixed weight vector [1,1], (i.e., if data bit is '1', the two antennas turn on the reflection together).

In some aspects, a network entity may apply an antenna grouping technique in the case where a number of antennas N in a BD is greater than a number M of spatial streams configured for the BD, as shown in the example of FIG. 7. For example, if N>2 antennas, the reader may estimate the channel state of the backscatter link corresponding to each antenna, and then determine M≤N spatial streams are transmitted. If M<N, then for each of the M spatial streams, $n_i$ antennas of BD 701 are grouped together to switch on or off the reflection for spatial stream i (which is equivalent to precoding/beamforming with fixed weight vector [1, . . . , 1]), satisfying:

$$\sum_{i=1}^{M} n_i \le N \tag{6}$$

where one antenna can only be a part of one group.

When a network entity (e.g., BS 602 in FIGS. 6A and 6B) configures such antenna grouping information to BD 701:

$$\lceil \log_2 N \rceil \text{ bits} \tag{7}$$

are used to express M, and a $$\text{length-}N \text{ bitmap } b_i \tag{8}$$

is used to express the number of antennas in BD 701, for each spatial stream i=1~M.

Channel Estimation and Signal Detection

A network entity may employ channel estimation and signal detection schemes to obtain approximate measurements of the channel matrix and channel vector. For example, to estimate a backscatter link channel matrix H, the RF source may transmit a signal while BD 701 is mandated to switch on the reflection of each antenna (e.g., to transmit a '1' bit) in a given pattern. In addition, the reader can obtain the estimation of equivalent channel vector $\tilde{h}_i$ of one antenna based on receiving the reflected reference signal:

$$\hat{h}_i = \frac{y_i - z_{direct}}{s_r} \tag{9}$$

when the other antennas switch off reflection, where $s_r$ is the reference signal. Accordingly, the equivalent channel matrix is determined by the expression $$\hat{H} = [\hat{h}_1, \hat{h}_2] \tag{10}$$

After obtaining $\hat{H}$, the network entity may determine the number of spatial streams of backscatter link based on $\hat{H}$. In one example, the number of spatial streams is equal to the rank of $\hat{H}$. If the network entity determines that a single spatial stream is transmitted, the transmission format selected depends on which magnitude of the reflected reference signal ($\|\hat{h}_1\|_2$, $\|\hat{h}_2\|_2$, $\|\hat{h}_1+\hat{h}_2\|_2$) is the largest.

If the network entity determines that two spatial streams are transmitted, the reader may detect the values of $\{x_i\}_{i=1,2}$ based on the received signal, y. For example, in a Minimum Mean Square Error or MMSE-based method:

$$\hat{x} = \begin{bmatrix} \hat{x}_1 \\ \hat{x}_2 \end{bmatrix} \left(\hat{H}^H \hat{H} + \frac{\sigma_s}{\sigma_n}\right)^{-1} \hat{H}^H (y - z_{direct}) \tag{11}$$

Determining the state of switching the reflection-off or reflection-on of the Antenna i can be based on whether $\hat{x}_i<0.5$ or $\hat{x}_i>0.5$.

Note, referring back to FIG. 5, $h_{0,1}$ and $h_{0,2}$ are associated with $h_{BD}$, $h_1$ and $h_2$ are associated with $h_{DU}$, $z_{direct}$ is associated with $h_{BU}$.

Figure 8:
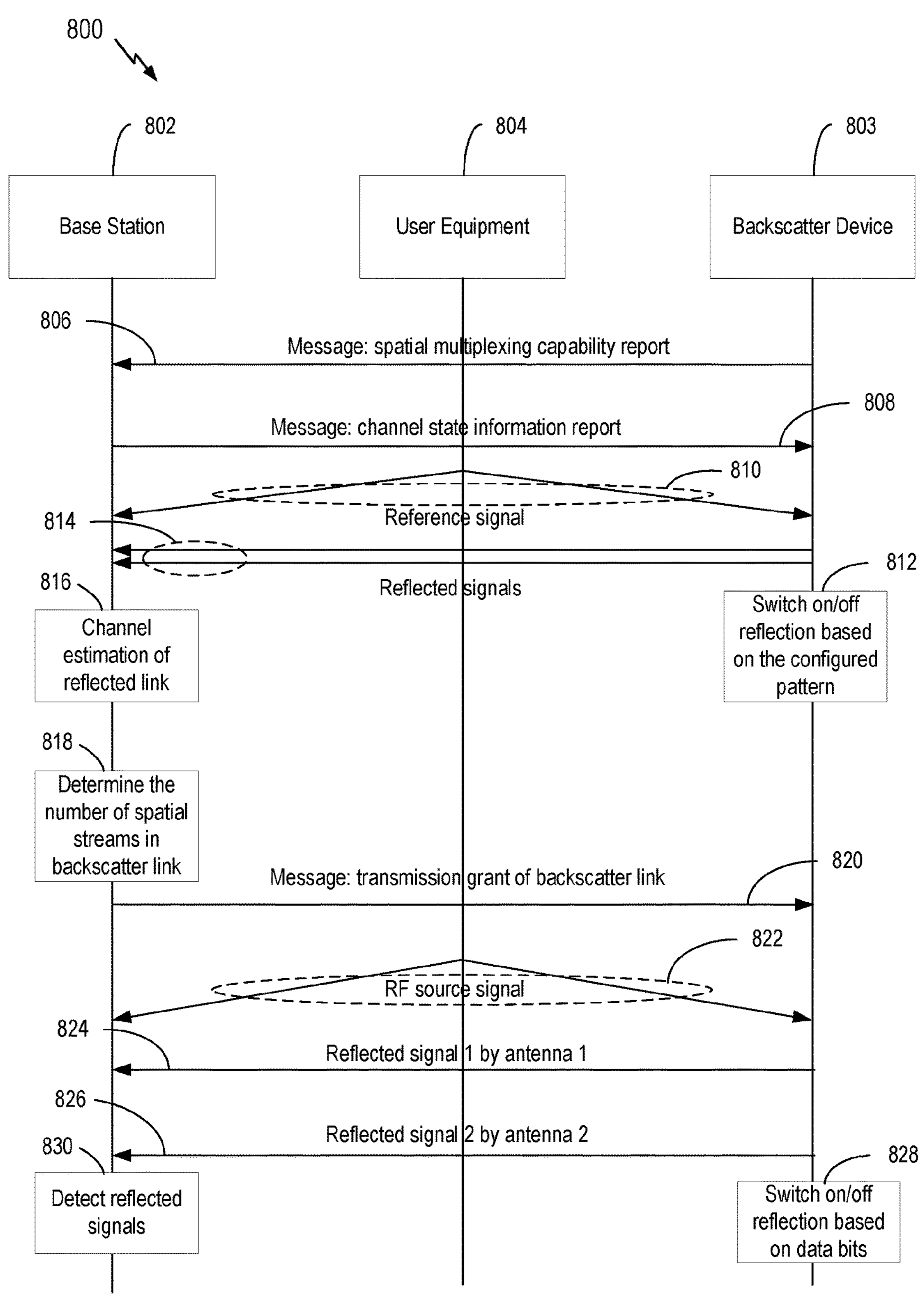
FIG. 8 depicts a process flow of procedures and messages communicated between a base station, user equipment, and a backscatter device.

Example Process Flow for Spatial Multiplexing by Backscatter Device with Multiple Antennas FIG. 8 depicts a process flow 800 of procedures and messages communicated between BS 802, UE 804, and BD 803, where UE 804 is configured as the RF source and BS 802 (e.g., gNB) is configured as the reader.

Flow 800 begins at step 806 with BD 803 sending a spatial multiplexing capability report to BS 802. In some aspects, the spatial multiplexing capability report contains a maximum number of spatial streams supported by the backscatter device, denoted as $N_{cap}$ in this example.

Figure 10:
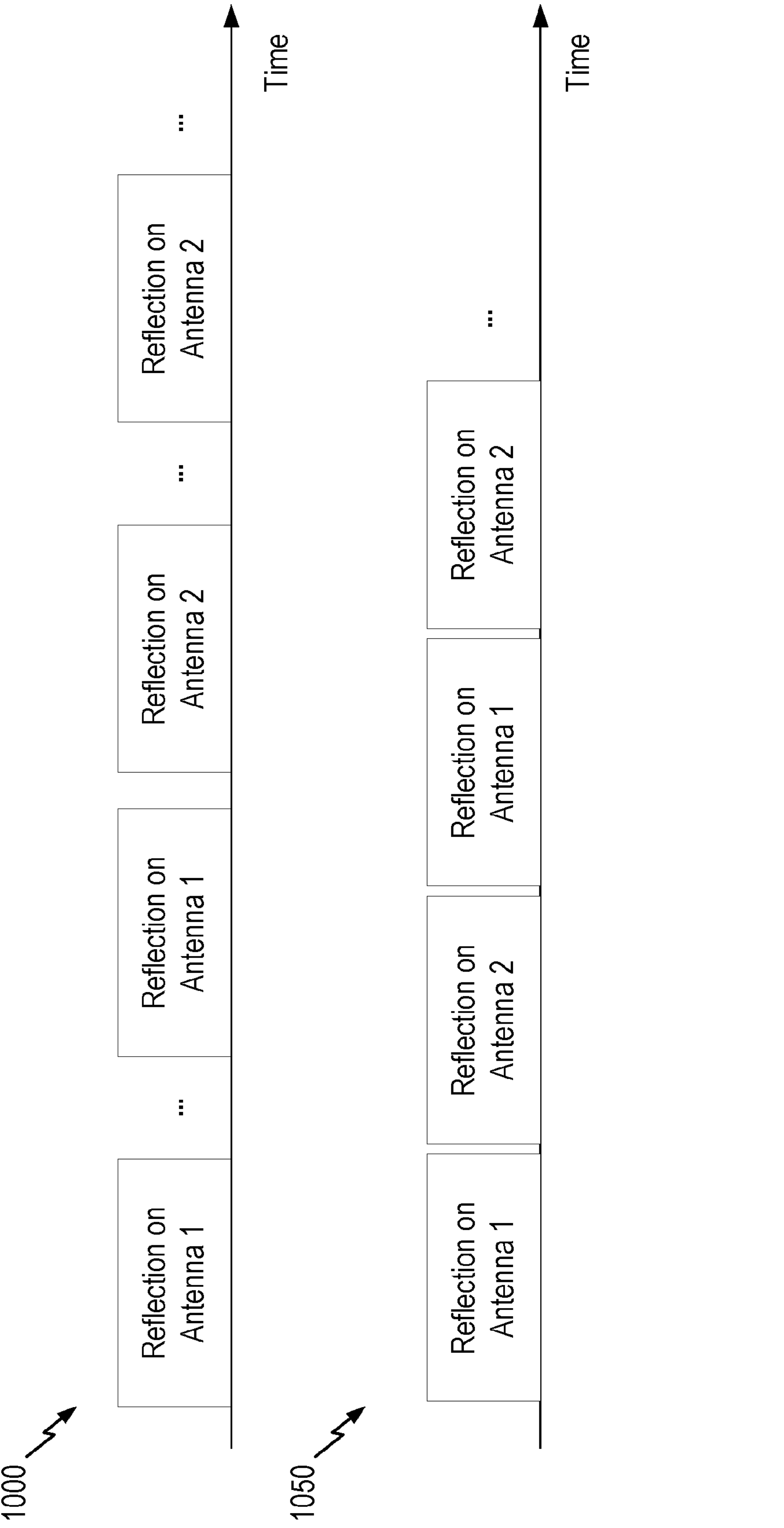
FIG. 10 depicts two example reflection patterns that may be used by a backscatter device configured to spatially multiplex transmissions.

At step 808, BS 802 transmits a channel state information report to BD 803, which in some aspects may include a mandate-reflection-on pattern for multiple antennas at BD 803. An example of the mandate-reflection-on pattern is also depicted in FIG. 10. To support the reader's detection, the RF source (i.e., UE 804) may send a reference signal reflection 810 when each of the antennas of BD 803 switch on/off the reflection in turns (step 812) generating reflected signals 814, so that the reader (e.g., gNB 802) can estimate a channel matrix of the reflected signal (step 816) from BD 803 and determine the number of spatial streams in the backscatter link at step 818.

At step 820, BS 802 transmits to BD 803 a transmission grant for a backscatter link message, which in some aspects includes the number of spatial streams in data transmission of backscatter link and the transmission format, if, for example, the number of spatial streams is smaller than the number of BD's antennas. Subsequently, UE 804 transmits an RF source signal 822 to BS 802 and BD 803 to initiate transmission of reflected signals by BD 803 (e.g., using a plurality of antennas, as depicted in the examples of FIGS. 6A and 6B).

At steps 824 and 826, reflected signals by antenna 1 and antenna 2 of BD 803, respectively, are transmitted from the BD 803 to the BS 802, whereby BD 803 switches on/off reflection based on data bits 828 while reflected signals are detected 830 by BS 802.

Figure 9:
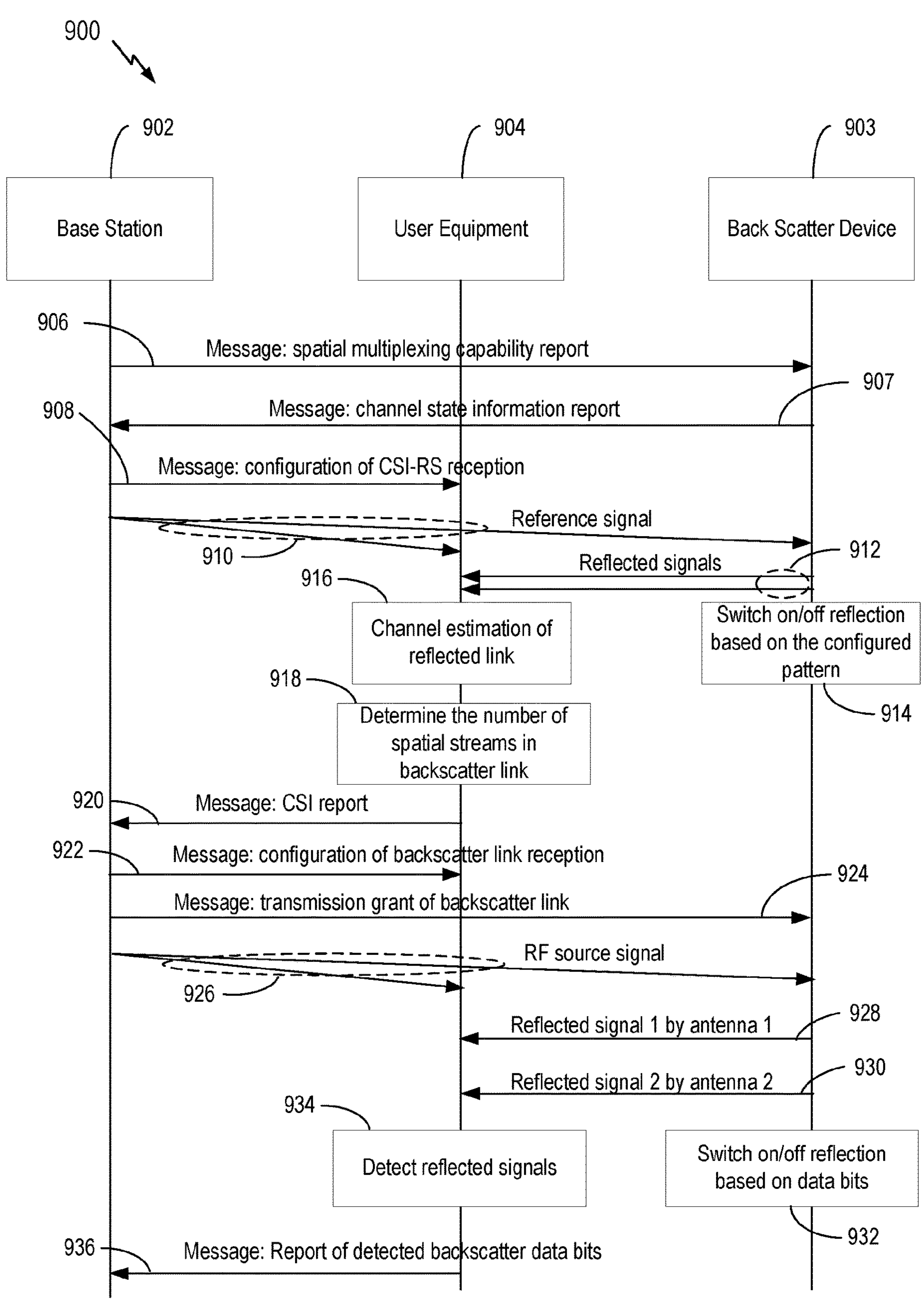
FIG. 9 depicts another process flow of procedures and messages communicated between a base station, user equipment, and a backscatter device.

FIG. 9 depicts another process flow 900 of procedures and messages communicated between BS 902, UE 904, and BD 903 where UE 904 is configured as the reader and BS 802 (e.g., gNB) is configured as the RF source.

Flow 900 begins at step 906 with BS 902 conveying a spatial multiplexing capability report message to BD 903.

At step 907. BD 903 transmits a channel state information report to BS 902 containing a mandate-reflection-on pattern for multiple antennas at BD 903. In response to the message received by BD 903 at step 907, a configuration of CSI-RS reception message is transmitted from BS 902 to UE 904, including, in some aspects, information related to the type of backscatter link (since the UE 904 may apply different channel estimation methods depending on whether it is for direct link or backscatter link) and a mandate-reflection-on pattern for multiple antennas at BD 903.

To support the reader's detection, the RF source (i.e., BS 902) may send a reference signal reflection 910 when each of the antennas of BD 903 switch on/off the reflection in turns (step 914) generating reflected signals 912, so that the reader (e.g., UE 904) can estimate a channel matrix of the reflected signal (step 916) from BD 903 and determine the number of spatial streams in the backscatter link 918.

After determining the number of spatial streams, a CSI report message is transmitted from UE 904 to BS 902 (e.g., gNB), indicating information related to backscatter link between UE 904 and BD 903. In response to the CSI report message, a configuration of backscatter link reception message (step 922) is transmitted from BS 902 to 904 UE, including: 1) the number of spatial streams in data transmission of the backscatter link; and 2) the transmission format, if the number of spatial streams is smaller than the number of BD's antennas.

At step 924. BS 902 transmits to BD 903 a transmission grant of backscatter link message. In response to the grant message, BS 902 transmits an RF source signal 926 to UE 904 and BD 903 to initiate transmission of reflected signals by the antennas (1 and 2) at steps 928 and 930, respectively, transmitting the reflected signals (1 and 2) from BD 903 to the BS 902, whereby BD 903 switches on/off reflection based on data bits 932 while reflected signals are detected 934 by UE 904. In addition, once the reflected signals are detected by UE 904, a report of detected backscatter data bits message 936 may be conveyed by UE 904 to BS 902 confirming transmission and detection of the reflected signals from BD 903.

FIG. 10 depicts examples (1000 and 1050) of reflection patterns that may be used by a backscatter device configured to spatially multiplex transmissions, which in some aspects may be referred to as "mandate-reflection on patterns." In order to support and estimate the channel matrix of backscatter link, reference signals (e.g., CSI-RS) may be transmitted periodically or aperiodically by the RF source (a UE or BS), while a BD switches on/off its reflection at each antenna, respectively. Multiple time units may be needed for each antenna (1 and 2), in order to improve channel estimation performance due to the possibility of weak signals (e.g., in terms of signal-to-noise (SNR) ratio) in the backscatter link.

In the first example, reflection pattern 1000 switches on each antenna for multiple time units (e.g., slots or symbols) in sequence. For example, antenna 1 is switched on for multiple time units, then antenna 2 is switched on for multiple time units, and so-on. Accordingly, reflection pattern 1000 may be referred to as a sequential non-interleaved reflection pattern; in other words, where individual antennas are not interleaved in the pattern.

In the second example, reflection pattern 1050 switches on each antenna for some number of time units in an interleaved fashion, e.g., switching back and forth between antennas during the pattern. Accordingly, pattern 1050 may be referred to as an interleaved reflection pattern; in other words, where individual antennas are interleaved in the pattern.

The network entity may adopt reflection pattern 1000 or 1050 which is generally determined by BS to BD and UE and its configuration. For example, the network entity may adopt reflection pattern 1000 where BS, BD, and UE are configured to support sequential non-interleaved reflection patterns. In another example, the network entity may adopt reflection pattern 1050 where BS, BD, and UE are configured to support interleaved reflection patterns.

Example Operations of a Network Entity

Figure 11:
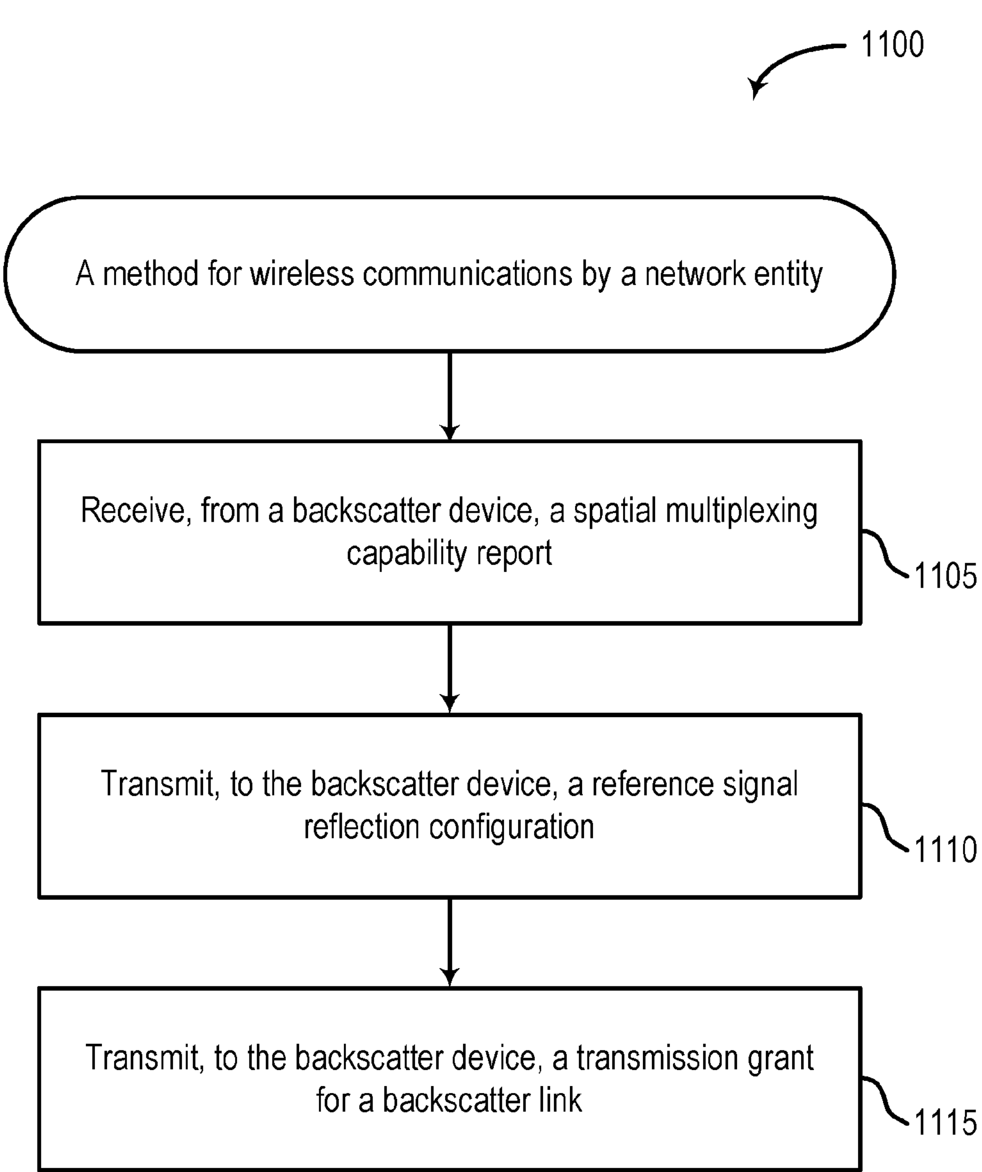
FIG. 11 depicts a method for wireless communications.

FIG. 11 shows an example of a method 1100 for wireless communications by a network entity, such as BS 102 of FIGS. 1 and 3, or a disaggregated base station as discussed with respect to FIG. 2.

Method 1100 begins at step 1105 with receiving, from a backscatter device, a spatial multiplexing capability report. In some cases, the operations of this step refer to, or may be performed by, circuitry for receiving and/or code for receiving as described with reference to FIG. 14.

Method 1100 then proceeds to step 1110 with transmitting, to the backscatter device, a reference signal reflection configuration. In some cases, the operations of this step refer to, or may be performed by, circuitry for transmitting and/or code for transmitting as described with reference to FIG. 14.

Method 1100 then proceeds to step 1115 with transmitting, to the backscatter device, a transmission grant for a backscatter link. In some cases, the operations of this step refer to, or may be performed by, circuitry for transmitting and/or code for transmitting as described with reference to FIG. 14.

In some aspects, the spatial multiplexing capability report comprises an indication of a maximum number of spatial streams supported by the backscatter device.

In some aspects, the reference signal reflection configuration comprises a reflection pattern for a plurality of reflected reference signals.

In some aspects, the transmission grant for the backscatter link comprises an indication of a number of spatial streams for the backscatter link.

In some aspects, the transmission grant for the backscatter link further comprises an indication of a transmission format for transmitting one or more reflected radio waves when the number of spatial streams is less than a number of antennas of the backscatter device.

In some aspects, the transmission format for transmitting the one or more reflected radio waves comprises a selection of one or more antennas of the backscatter device for generating one or more spatial streams.

In some aspects, the method 1100 further includes receiving, from the backscatter device, a plurality of reflected reference signals. In some cases, the operations of this step refer to, or may be performed by, circuitry for receiving and/or code for receiving as described with reference to FIG. 14.

In some aspects, the method 1100 further includes performing channel estimation based on the plurality of reflected reference signals. In some cases, the operations of this step refer to, or may be performed by, circuitry for performing and/or code for performing as described with reference to FIG. 14.

In some aspects, the method 1100 further includes determining, based on the plurality of reflected reference signals, a number of spatial streams on the backscatter link between the backscatter device and the network entity. In some cases, the operations of this step refer to, or may be performed by, circuitry for determining and/or code for determining as described with reference to FIG. 14.

In some aspects, the method 1100 further includes receiving, from a user equipment, a plurality of reference signals. In some cases, the operations of this step refer to, or may be performed by, circuitry for receiving and/or code for receiving as described with reference to FIG. 14.

In some aspects, the method 1100 further includes receiving, from the backscatter device, a plurality of reflected reference signals. In some cases, the operations of this step refer to, or may be performed by, circuitry for receiving and/or code for receiving as described with reference to FIG. 14.

In some aspects, the method 1100 further includes performing channel estimation based on the plurality of reference signals and the plurality of reflected reference signals. In some cases, the operations of this step refer to, or may be performed by, circuitry for performing and/or code for performing as described with reference to FIG. 14.

In some aspects, the method 1100 further includes determining, based on the plurality of reflected reference signals, a number of spatial streams on the backscatter link between the backscatter device and the network entity. In some cases, the operations of this step refer to, or may be performed by, circuitry for determining and/or code for determining as described with reference to FIG. 14.

In some aspects, the method 1100 further includes receiving, from the backscatter device, one or more reflected radio waves using the determined number of spatial streams. In some cases, the operations of this step refer to, or may be performed by, circuitry for receiving and/or code for receiving as described with reference to FIG. 14.

In some aspects, the method 1100 further includes determining received data of the backscatter device based on the one or more reflected radio waves. In some cases, the operations of this step refer to, or may be performed by, circuitry for determining and/or code for determining as described with reference to FIG. 14.

In some aspects, the method 1100 further includes receiving, from a user equipment, one or more radio waves. In some cases, the operations of this step refer to, or may be performed by, circuitry for receiving and/or code for receiving as described with reference to FIG. 14.

In some aspects, the method 1100 further includes receiving, from the backscatter device, one or more reflected radio waves using the determined number of spatial streams. In some cases, the operations of this step refer to, or may be performed by, circuitry for receiving and/or code for receiving as described with reference to FIG. 14.

In some aspects, the method 1100 further includes determining received data of the backscatter device based on the one or more radio waves and the one or more reflected radio waves. In some cases, the operations of this step refer to, or may be performed by, circuitry for determining and/or code for determining as described with reference to FIG. 14.

In some aspects, the radio waves comprise at least one of: a reference signal; a data signal; or a sine wave signal.

In some aspects, the method 1100 further includes transmitting, to a user equipment, a reference signal reception configuration. In some cases, the operations of this step refer to, or may be performed by, circuitry for transmitting and/or code for transmitting as described with reference to FIG. 14.

In some aspects, the reference signal reception configuration comprises: an indication that a plurality of reflected reference signals are for the backscatter link; and a reflection pattern for reflecting the plurality of reflected reference signals using a plurality of antennas.

In some aspects, the method 1100 further includes receiving, from the user equipment, a report of received backscatter data. In some cases, the operations of this step refer to, or may be performed by, circuitry for receiving and/or code for receiving as described with reference to FIG. 14.

In some aspects, the method 1100 further includes transmitting, to a user equipment and to a backscatter device, a plurality of reference signals. In some cases, the operations of this step refer to, or may be performed by, circuitry for transmitting and/or code for transmitting as described with reference to FIG. 14.

In some aspects, the method 1100 further includes receiving, from a user equipment, a channel state information report regarding a backscatter link between the user equipment and the backscatter device. In some cases, the operations of this step refer to, or may be performed by, circuitry for receiving and/or code for receiving as described with reference to FIG. 14.

In some aspects, the channel state information report regarding the backscatter link between the user equipment and the backscatter device comprises: an indication of a number of spatial streams to be used on the backscatter link; and a mapping of one or more antennas of the backscatter device to each spatial stream of the number of spatial streams.

In some aspects, the method 1100 further includes transmitting, to the user equipment, a configuration for backscatter link reception. In some cases, the operations of this step refer to, or may be performed by, circuitry for transmitting and/or code for transmitting as described with reference to FIG. 14.

In some aspects, the configuration for backscatter link reception comprises: an indication of a number of spatial streams to be used on the backscatter link; and an indication of a transmission format for receiving one or more reflected radio waves when the number of spatial streams is less than a number of antennas of the backscatter device.

In some aspects, the transmission format for transmitting the one or more reflected radio waves comprises a selection of one or more antennas of the backscatter device for generating one or more spatial streams.

Figure 14:
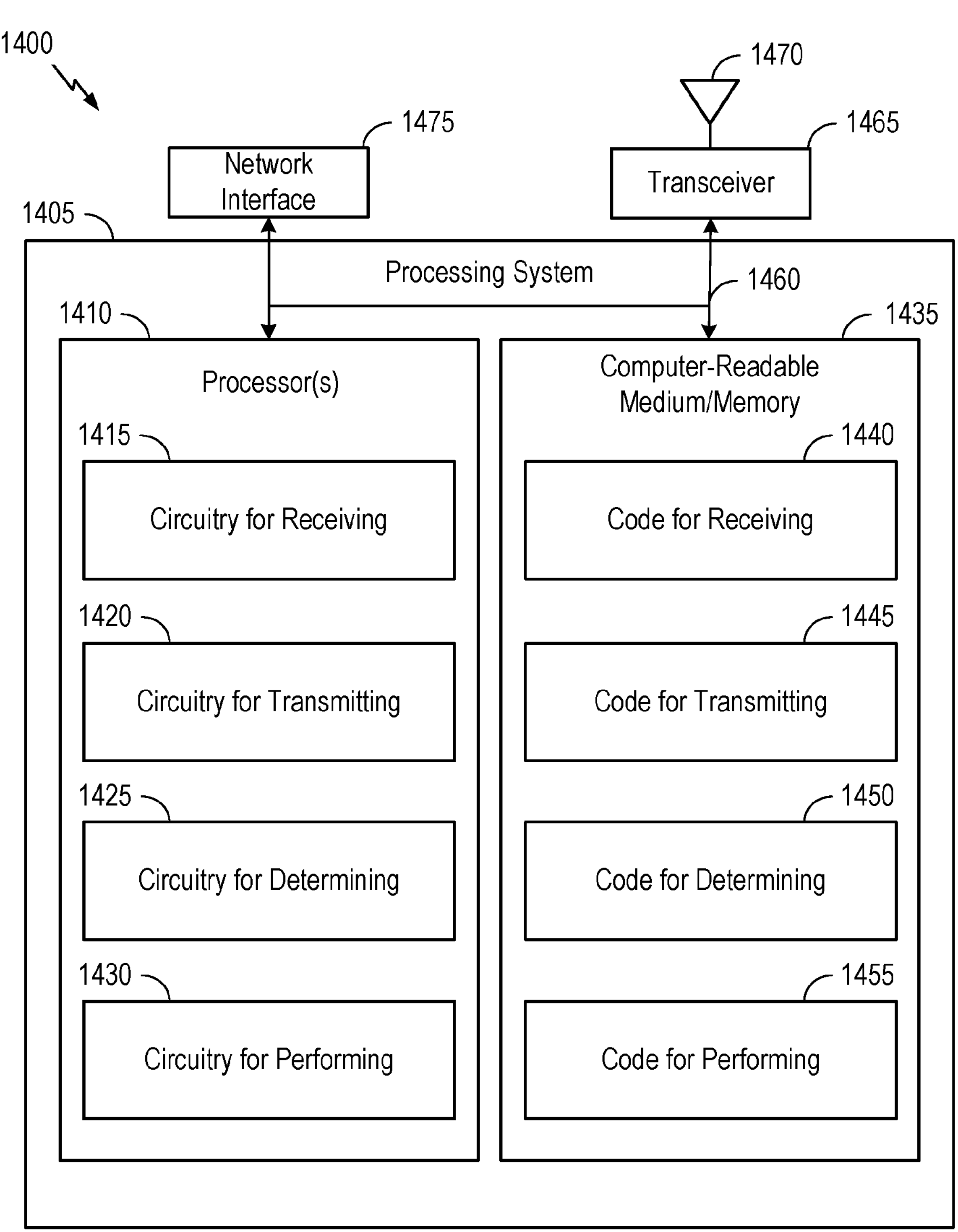
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Example Operations of a User Equipment

Figure 12:
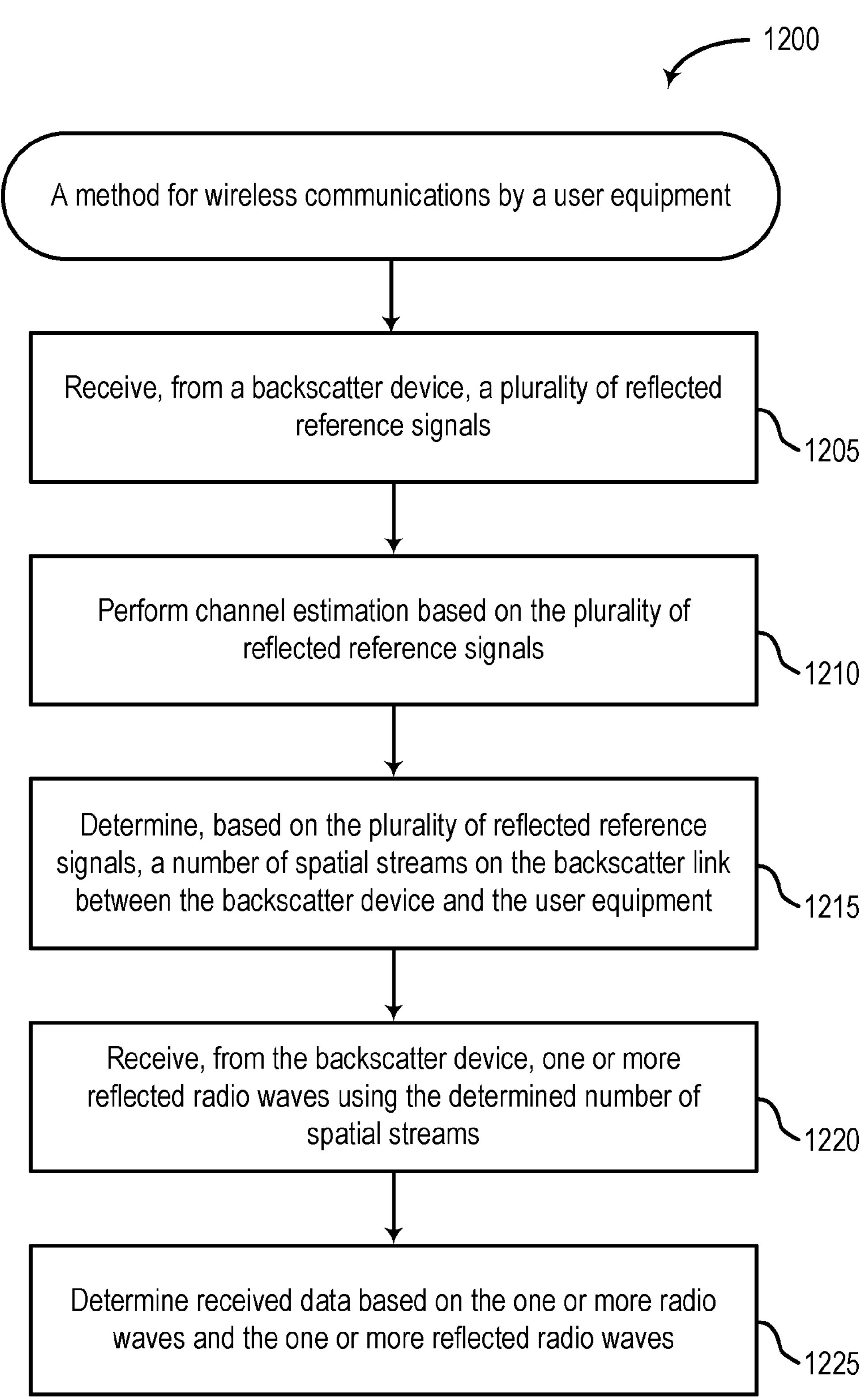
FIG. 12 depicts a method for wireless communications.

FIG. 12 shows an example of a method 1200 for wireless communications by a UE, such as UE 104 of FIGS. 1 and 3.

Method 1200 begins at step 1205 with receiving, from a backscatter device, a plurality of reflected reference signals. In some cases, the operations of this step refer to, or may be performed by, circuitry for receiving and/or code for receiving as described with reference to FIG. 15.

Method 1200 then proceeds to step 1210 with performing channel estimation based on the plurality of reflected reference signals. In some cases, the operations of this step refer to, or may be performed by, circuitry for performing and/or code for performing as described with reference to FIG. 15.

Method 1200 then proceeds to step 1215 with determining, based on the plurality of reflected reference signals, a number of spatial streams on the backscatter link between the backscatter device and the user equipment. In some cases, the operations of this step refer to, or may be performed by, circuitry for determining and/or code for determining as described with reference to FIG. 15.

Method 1200 then proceeds to step 1220 with receiving, from the backscatter device, one or more reflected radio waves using the determined number of spatial streams. In some cases, the operations of this step refer to, or may be performed by, circuitry for receiving and/or code for receiving as described with reference to FIG. 15.

Method 1200 then proceeds to step 1225 with determining received data based on the one or more radio waves and the one or more reflected radio waves. In some cases, the operations of this step refer to, or may be performed by, circuitry for determining and/or code for determining as described with reference to FIG. 15.

In some aspects, the method 1200 further includes receiving, from a network entity, a plurality of reference signals. In some cases, the operations of this step refer to, or may be performed by, circuitry for receiving and/or code for receiving as described with reference to FIG. 15.

In some aspects, the method 1200 further includes receiving, from a backscatter device, a plurality of reflected reference signals. In some cases, the operations of this step refer to, or may be performed by, circuitry for receiving and/or code for receiving as described with reference to FIG. 15.

In some aspects, the method 1200 further includes performing channel estimation based on the plurality of reference signals and the plurality of reflected reference signals. In some cases, the operations of this step refer to, or may be performed by, circuitry for performing and/or code for performing as described with reference to FIG. 15.

In some aspects, the method 1200 further includes determining, based on the plurality of reflected reference signals, a number of spatial streams on the backscatter link between the backscatter device and the user equipment. In some cases, the operations of this step refer to, or may be performed by, circuitry for determining and/or code for determining as described with reference to FIG. 15.

In some aspects, the method 1200 further includes receiving, from the network entity, one or more radio waves. In some cases, the operations of this step refer to, or may be performed by, circuitry for receiving and/or code for receiving as described with reference to FIG. 15.

In some aspects, the method 1200 further includes receiving, from the backscatter device, one or more reflected radio waves using the determined number of spatial streams. In some cases, the operations of this step refer to, or may be performed by, circuitry for receiving and/or code for receiving as described with reference to FIG. 15.

In some aspects, the method 1200 further includes determining received data based on the one or more radio waves and the one or more reflected radio waves. In some cases, the operations of this step refer to, or may be performed by, circuitry for determining and/or code for determining as described with reference to FIG. 15.

In some aspects, the radio waves comprise at least one of: a reference signal; a data signal; or a sine wave signal.

In some aspects, the method 1200 further includes receiving, from a network entity, a reference signal reception configuration. In some cases, the operations of this step refer to, or may be performed by, circuitry for receiving and/or code for receiving as described with reference to FIG. 15.

In some aspects, the reference signal reception configuration comprises: an indication that the plurality of reflected reference signals are for the backscatter link; and a reflection pattern for the plurality of reflected reference signals.

In some aspects, the method 1200 further includes transmitting, to a network entity, a channel state information report regarding a backscatter link between the user equipment and the backscatter device. In some cases, the operations of this step refer to, or may be performed by, circuitry for transmitting and/or code for transmitting as described with reference to FIG. 15.

In some aspects, the channel state information report regarding a backscatter link between the user equipment and the backscatter device comprises: an indication of a number of spatial streams to be used on the backscatter link; and a mapping of one or more antennas of the backscatter device to each spatial stream of the number of spatial streams.

In some aspects, the method 1200 further includes receiving, from a network entity, a configuration for backscatter link reception. In some cases, the operations of this step refer to, or may be performed by, circuitry for receiving and/or code for receiving as described with reference to FIG. 15.

In some aspects, the configuration for backscatter link reception comprises: an indication of the number of spatial streams to be used on the backscatter link; and an indication of a transmission format for receiving the one or more reflected radio waves when the number of spatial streams is less than a number of antennas of the backscatter device.

In some aspects, the transmission format for transmitting one or more reflected radio waves comprises the selection of one or more antennas of the backscatter device for one or more spatial streams.

In some aspects, the method 1200 further includes transmitting, to a network entity, a report of received backscatter data. In some cases, the operations of this step refer to, or may be performed by, circuitry for transmitting and/or code for transmitting as described with reference to FIG. 15.

Figure 15:
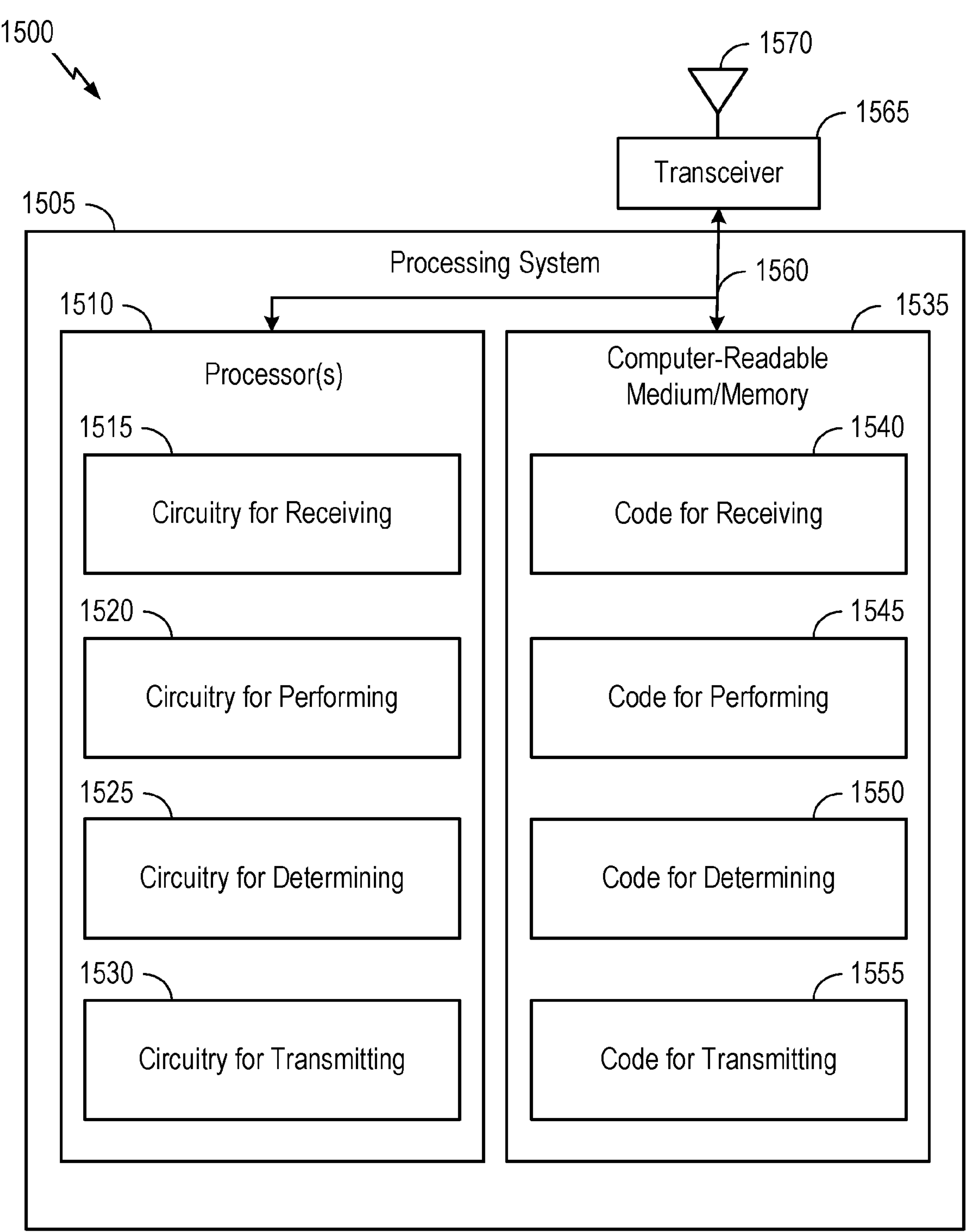
FIG. 15 depicts aspects of an example communications device.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Example Operations of a Backscatter Device

Figure 13:
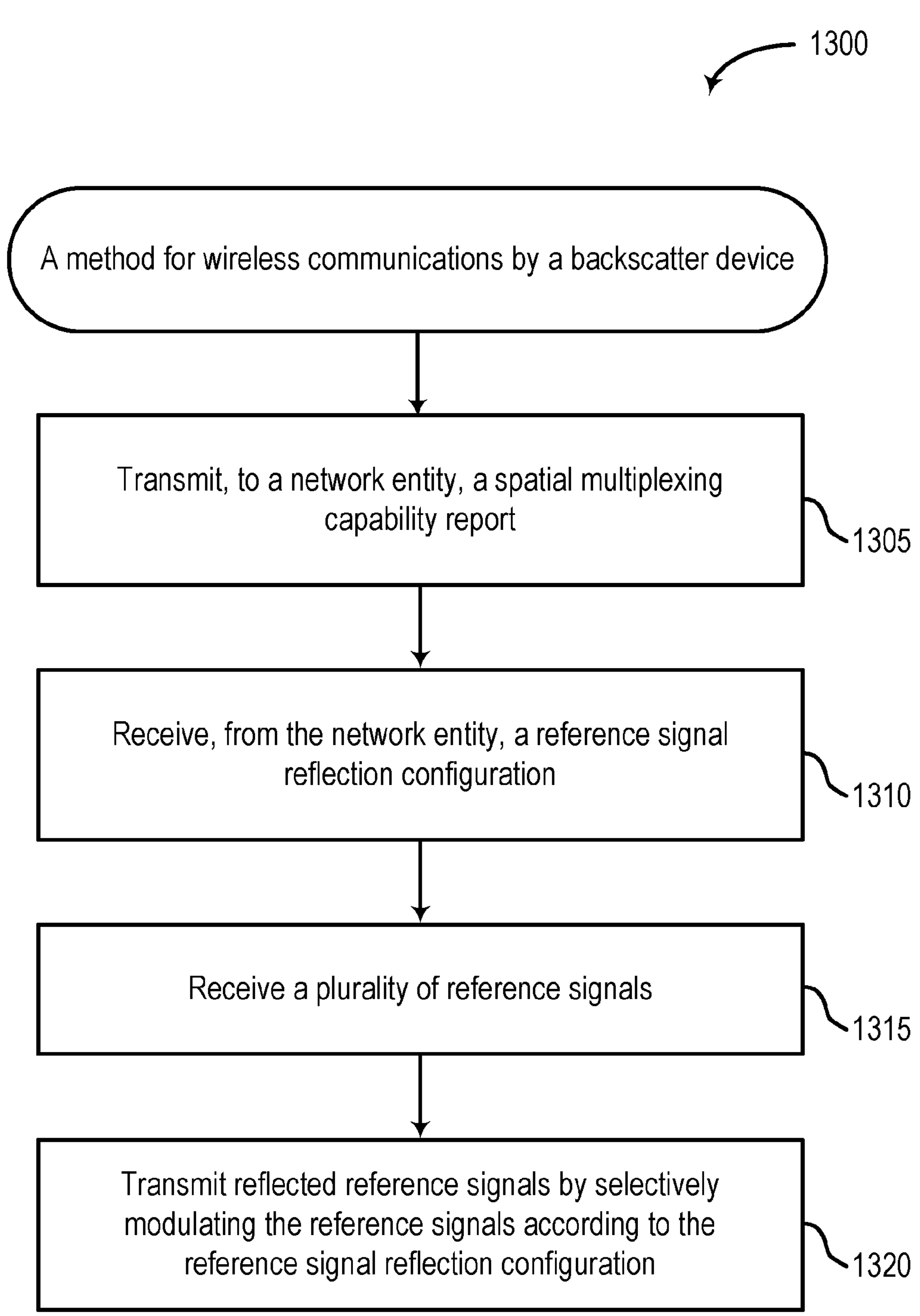
FIG. 13 depicts a method for wireless communications.

FIG. 13 shows an example of a method 1300 for wireless communications by a backscatter device. In some aspects, a backscatter device may be a type of user equipment, such as UE 104 of FIGS. 1 and 3. Further, a backscatter device may be as described with respect to FIGS. 6A, 6B, and 7.

Method 1300 begins at step 1305 with transmitting, to a network entity, a spatial multiplexing capability report. In some cases, the operations of this step refer to, or may be performed by, circuitry for transmitting and/or code for transmitting as described with reference to FIG. 15.

Method 1300 then proceeds to step 1310 with receiving, from the network entity, a reference signal reflection configuration. In some cases, the operations of this step refer to, or may be performed by, circuitry for receiving and/or code for receiving as described with reference to FIG. 15.

Method 1300 then proceeds to step 1315 with receiving a plurality of reference signals. In some cases, the operations of this step refer to, or may be performed by, circuitry for receiving and/or code for receiving as described with reference to FIG. 15.

Method 1300 then proceeds to step 1320 with transmitting reflected reference signals by selectively modulating the reference signals according to the reference signal reflection configuration. In some cases, the operations of this step refer to, or may be performed by, circuitry for transmitting and/or code for transmitting as described with reference to FIG. 15.

In some aspects, receiving the plurality of reference signals comprises receiving the plurality of reference signals from a user equipment.

In some aspects, the method 1300 further includes receiving, from the network entity, a transmission grant for a backscatter link. In some cases, the operations of this step refer to, or may be performed by, circuitry for receiving and/or code for receiving as described with reference to FIG. 15.

In some aspects, the method 1300 further includes receiving a plurality of radio waves. In some cases, the operations of this step refer to, or may be performed by, circuitry for receiving and/or code for receiving as described with reference to FIG. 15.

In some aspects, the method 1300 further includes transmitting reflected radio waves by selectively modulating the radio waves according to the transmission grant for the backscatter link. In some cases, the operations of this step refer to, or may be performed by, circuitry for transmitting and/or code for transmitting as described with reference to FIG. 15.

In some aspects, receiving the plurality of radio waves comprises receiving the plurality of radio waves from a user equipment, and transmitting the reflected radio waves comprises transmitting the reflected radio waves to the network entity.

In some aspects, receiving the plurality of radio waves comprises receiving the plurality of radio waves from the network entity, and transmitting the reflected radio waves comprises transmitting the reflected radio waves to a user equipment.

In some aspects, transmitting the reflected radio waves is performed using a plurality of antennas.

In some aspects, the transmitting reflected radio waves by selectively modulating the radio waves, comprises: selecting one or more antennas of the backscatter device for a spatial stream of one or more spatial streams according to the transmission grant for the backscatter link; and switching on or off the reflection of the selected one or more antennas according to the data of the spatial stream.

In some aspects, the radio waves comprise at least one of: a reference signal; a data signal; or a sine wave signal.

In some aspects, receiving the plurality of reference signals comprises receiving the plurality of reference signals from the network entity.

In some aspects, transmitting the reflected reference signals by selectively modulating the reference signals, comprises: selecting one or more antennas of the backscatter device according to the reference signal reflection configuration; and switching on or off the reflection of the selected one or more antennas according to the reference signal reflection configuration.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Communications Devices

FIG. 14 depicts aspects of an example communications device 1400. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1465 (e.g., a transmitter and/or a receiver) and/or a network interface 1475. The transceiver 1465 is configured to transmit and receive signals for the communications device 1400 via the antenna 1470, such as the various signals as described herein. The network interface 1475 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors

1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1100 described with respect to FIG. 11, or any aspect related to it. Note that reference to a processor of communications device 1400 performing a function may include one or more processors 1410 of communications device 1400 performing that function.

In the depicted example, the computer-readable medium/memory 1435 stores code (e.g., executable instructions), such as code for receiving 1440, code for transmitting 1445, code for determining 1450, and code for performing 1455. Processing of the code for receiving 1440, code for transmitting 1445, code for determining 1450, and code for performing 1455 may cause the communications device 1400 to perform the method 1100 described with respect to FIG. 11, or any aspect related to it.

The one or more processors 1410 include circuitry configured to implement (e.g., execute) the code stored in the computer-readable medium/memory 1435, including circuitry such as circuitry for receiving 1415, circuitry for transmitting 1420, circuitry for determining 1425, and circuitry for performing 1430. Processing with circuitry for receiving 1415, circuitry for transmitting 1420, circuitry for determining 1425, and circuitry for performing 1430 may cause the communications device 1400 to perform the method 1100 as described with respect to FIG. 11, or any aspect related to it.

Various components of the communications device 1400 may provide means for performing the method 1100 as described with respect to FIG. 11, or any aspect related to it. Means for transmitting, sending or outputting for transmission may include transceivers 332 and/or antenna(s) 334 of the BS 102 illustrated in FIG. 3 and/or the transceiver 1465 and the antenna 1470 of the communications device 1400 in FIG. 14. Means for receiving or obtaining may include transceivers 332 and/or antenna(s) 334 of the BS 102 illustrated in FIG. 3 and/or the transceiver 1465 and the antenna 1470 of the communications device 1400 in FIG. 14.

FIG. 15 depicts aspects of an example communications device 1500. In some aspects, communications device 1500 is a user equipment, such as UE 104 described above with respect to FIGS. 1 and 3.

The communications device 1500 includes a processing system 1505 coupled to the transceiver 1565 (e.g., a transmitter and/or a receiver). The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the method 1200 described with respect to FIG. 12, or any aspect related to it, and/or the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for receiving 1540, code for performing 1545, code for determining 1550, and code for transmitting 1555. Processing of the code for receiving 1540, code for performing 1545, code for determining 1550, and code for transmitting 1555 may cause the communications device 1500 to perform the method 1200 described with respect to FIG. 12, or any aspect related to it, and/or the method 1300 described with respect to FIG. 13, or any aspect related to it.

The one or more processors 1510 include circuitry configured to implement (e.g., execute) the code stored in the computer-readable medium/memory 1535, including circuitry such as circuitry for receiving 1515, circuitry for performing 1520, circuitry for determining 1525, and circuitry for transmitting 1530. Processing with circuitry for receiving 1515, circuitry for performing 1520, circuitry for determining 1525, and circuitry for transmitting 1530 may cause the communications device 1500 to perform the method 1200 described with respect to FIG. 12, or any aspect related to it, and/or the method 1300 described with respect to FIG. 13, or any aspect related to it.

Various components of the communications device 1500 may provide means for performing the method 1200 described with respect to FIG. 12, or any aspect related to it, and/or the method 1300 described with respect to FIG. 13, or any aspect related to it. For example, means for transmitting, sending or outputting for transmission may include transceivers 354 and/or antenna(s) 352 of the UE 104 illustrated in FIG. 3 and/or the transceiver 1565 and the antenna 1570 of the communications device 1500 in FIG. 15. Means for receiving or obtaining may include transceivers 354 and/or antenna(s) 352 of the UE 104 illustrated in FIG. 3 and/or the transceiver 1565 and the antenna 1570 of the communications device 1500 in FIG. 15.

EXAMPLE CLAUSES

Implementation examples are described in the following numbered clauses:

Clause 1: A method of wireless communications by a network entity, comprising: receiving, from a backscatter device, a spatial multiplexing capability report; transmitting, to the backscatter device, a reference signal reflection configuration; and transmitting, to the backscatter device, a transmission grant for a backscatter link.

Clause 2: The method of Clause 1, wherein the spatial multiplexing capability report comprises an indication of a maximum number of spatial streams supported by the backscatter device.

Clause 3: The method of any one of Clauses 1 and 2, wherein the reference signal reflection configuration comprises a reflection pattern for a plurality of reflected reference signals.

Clause 4: The method of any one of Clauses 1-3, wherein the transmission grant for the backscatter link comprises an indication of a number of spatial streams for the backscatter link.

Clause 5: The method of Clause 4, wherein the transmission grant for the backscatter link further comprises an indication of a transmission format for transmitting one or more reflected radio waves when the number of spatial streams is less than a number of antennas of the backscatter device.

Clause 6: The method of Clause 5, wherein the transmission format for transmitting the one or more reflected radio waves comprises a selection of one or more antennas of the backscatter device for generating one or more spatial streams.

Clause 7: The method of any one of Clauses 1-6, further comprising: receiving, from the backscatter device, a plurality of reflected reference signals. Some examples further include performing channel estimation based on the plurality of reflected reference signals. Some examples further include determining, based on the plurality of reflected reference signals, a number of spatial streams on the backscatter link between the backscatter device and the network entity.

Clause 8: The method of any one of Clauses 1-7, further comprising: receiving, from a user equipment, a plurality of reference signals. Some examples further include receiving, from the backscatter device, a plurality of reflected reference signals. Some examples further include performing channel estimation based on the plurality of reference signals and the plurality of reflected reference signals. Some examples further include determining, based on the plurality of reflected reference signals, a number of spatial streams on the backscatter link between the backscatter device and the network entity.

Clause 9: The method of any one of Clauses 1-8, further comprising: receiving, from the backscatter device, one or more reflected radio waves using the determined number of spatial streams. Some examples further include determining received data of the backscatter device based on the one or more reflected radio waves.

Clause 10: The method of any one of Clauses 1-9, further comprising: receiving, from a user equipment, one or more radio waves. Some examples further include receiving, from the backscatter device, one or more reflected radio waves using the determined number of spatial streams. Some examples further include determining received data of the backscatter device based on the one or more radio waves and the one or more reflected radio waves.

Clause 11: The method of Clause 10, wherein the radio waves comprise at least one of: a reference signal; a data signal; or a sine wave signal.

Clause 12: The method of any one of Clauses 1-11, further comprising: transmitting, to a user equipment, a reference signal reception configuration.

Clause 13: The method of Clause 12, wherein the reference signal reception configuration comprises: an indication that a plurality of reflected reference signals are for the backscatter link; and a reflection pattern for reflecting the plurality of reflected reference signals using a plurality of antennas.

Clause 14: The method of Clause 12, further comprising: receiving, from the user equipment, a report of received backscatter data.

Clause 15: The method of any one of Clauses 1-14, further comprising: transmitting, to a user equipment and to a backscatter device, a plurality of reference signals.

Clause 16: The method of any one of Clauses 1-15, further comprising: receiving, from a user equipment, a channel state information report regarding a backscatter link between the user equipment and the backscatter device.

Clause 17: The method of Clause 16, wherein the channel state information report regarding the backscatter link between the user equipment and the backscatter device comprises: an indication of a number of spatial streams to be used on the backscatter link; and a mapping of one or more antennas of the backscatter device to each spatial stream of the number of spatial streams.

Clause 18: The method of Clause 16, further comprising: transmitting, to the user equipment, a configuration for backscatter link reception.

Clause 19: The method of Clause 18, wherein the configuration for backscatter link reception comprises: an indication of a number of spatial streams to be used on the backscatter link; and an indication of a transmission format for receiving one or more reflected radio waves when the number of spatial streams is less than a number of antennas of the backscatter device.

Clause 20: The method of Clause 19, wherein the transmission format for transmitting the one or more reflected radio waves comprises a selection of one or more antennas of the backscatter device for generating one or more spatial streams.

Clause 21: A method of wireless communications by a user equipment, comprising: receiving, from a backscatter device, a plurality of reflected reference signals; performing channel estimation based on the plurality of reflected reference signals; determining, based on the plurality of reflected reference signals, a number of spatial streams on the backscatter link between the backscatter device and the user equipment; receiving, from the backscatter device, one or more reflected radio waves using the determined number of spatial streams; and determining received data based on the one or more radio waves and the one or more reflected radio waves.

Clause 22: The method of Clause 21, further comprising: receiving, from a network entity, a plurality of reference signals. Some examples further include receiving, from a backscatter device, a plurality of reflected reference signals. Some examples further include performing channel estimation based on the plurality of reference signals and the plurality of reflected reference signals. Some examples further include determining, based on the plurality of reflected reference signals, a number of spatial streams on the backscatter link between the backscatter device and the user equipment. Some examples further include receiving, from the network entity, one or more radio waves. Some examples further include receiving, from the backscatter device, one or more reflected radio waves using the determined number of spatial streams. Some examples further include determining received data based on the one or more radio waves and the one or more reflected radio waves.

Clause 23: The method of Clause 22, wherein the radio waves comprise at least one of: a reference signal; a data signal; or a sine wave signal.

Clause 24: The method of any one of Clauses 21-23, further comprising: receiving, from a network entity, a reference signal reception configuration.

Clause 25: The method of Clause 24, wherein the reference signal reception configuration comprises: an indication that the plurality of reflected reference signals are for the backscatter link; and a reflection pattern for the plurality of reflected reference signals.

Clause 26: The method of any one of Clauses 21-25, further comprising: transmitting, to a network entity, a channel state information report regarding a backscatter link between the user equipment and the backscatter device.

Clause 27: The method of Clause 26, wherein the channel state information report regarding a backscatter link between the user equipment and the backscatter device comprises: an indication of a number of spatial streams to be used on the backscatter link; and a mapping of one or more antennas of the backscatter device to each spatial stream of the number of spatial streams.

Clause 28: The method of any one of Clauses 21-27, further comprising: receiving, from a network entity, a configuration for backscatter link reception.

Clause 29: The method of Clause 28, wherein the configuration for backscatter link reception comprises: an indication of the number of spatial streams to be used on the backscatter link; and an indication of a transmission format for receiving the one or more reflected radio waves when the number of spatial streams is less than a number of antennas of the backscatter device.

Clause 30: The method of Clause 29, wherein the transmission format for transmitting one or more reflected radio waves comprises the selection of one or more antennas of the backscatter device for one or more spatial streams.

Clause 31: The method of any one of Clauses 21-30, further comprising: transmitting, to a network entity, a report of received backscatter data.

Clause 32: A method of wireless communications by a backscatter device, comprising: transmitting, to a network entity, a spatial multiplexing capability report; receiving, from the network entity, a reference signal reflection configuration; receiving a plurality of reference signals; and transmitting reflected reference signals by selectively modulating the reference signals according to the reference signal reflection configuration.

Clause 33: The method of Clause 32, wherein receiving the plurality of reference signals comprises receiving the plurality of reference signals from a user equipment.

Clause 34: The method of Clause 33, further comprising: receiving, from the network entity, a transmission grant for a backscatter link. Some examples further include receiving a plurality of radio waves. Some examples further include transmitting reflected radio waves by selectively modulating the radio waves according to the transmission grant for the backscatter link.

Clause 35: The method of Clause 34, wherein: receiving the plurality of radio waves comprises receiving the plurality of radio waves from a user equipment, and transmitting the reflected radio waves comprises transmitting the reflected radio waves to the network entity.

Clause 36: The method of Clause 34, wherein: receiving the plurality of radio waves comprises receiving the plurality of radio waves from the network entity, and transmitting the reflected radio waves comprises transmitting the reflected radio waves to a user equipment.

Clause 37: The method of Clause 34, wherein transmitting the reflected radio waves is performed using a plurality of antennas.

Clause 38: The method of Clause 34, wherein the transmitting reflected radio waves by selectively modulating the radio waves, comprises: selecting one or more antennas of the backscatter device for a spatial stream of one or more spatial streams according to the transmission grant for the backscatter link; and switching on or off the reflection of the selected one or more antennas according to the data of the spatial stream.

Clause 39: The method of Clause 38, wherein the radio waves comprise at least one of: a reference signal; a data signal; or a sine wave signal.

Clause 40: The method of any one of Clauses 32-39, wherein receiving the plurality of reference signals comprises receiving the plurality of reference signals from the network entity.

Clause 41: The method of any one of Clauses 32-40, wherein transmitting the reflected reference signals by selectively modulating the reference signals, comprises: selecting one or more antennas of the backscatter device according to the reference signal reflection configuration; and switching on or off the reflection of the selected one or more antennas according to the reference signal reflection configuration.

Clause 42: An apparatus, comprising: a memory comprising executable instructions; and a processor configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by a processor of an apparatus, cause the apparatus to perform a method in accordance with any one of Clauses 1-41.

Clause 45: A computer program product embodied on a computer-readable storage medium comprising code for performing a method in accordance with any one of Clauses 1-41.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a network entity, comprising:

at least one memory comprising computer-executable instructions; and one or more processors configured to execute the computer-executable instructions and cause the network entity to:

receive, from a backscatter device, a spatial multiplexing capability report;

transmit, to the backscatter device, a reference signal reflection configuration; and transmit, to the backscatter device, a transmission grant for a backscatter link.

2. The apparatus of claim 1, wherein the spatial multiplexing capability report comprises an indication of a maximum number of spatial streams supported by the backscatter device.

3. The apparatus of claim 1, wherein the reference signal reflection configuration comprises a reflection pattern for a plurality of reflected reference signals.

4. The apparatus of claim 1, wherein the transmission grant for the backscatter link comprises an indication of a number of spatial streams for the backscatter link.

5. The apparatus of claim 4, wherein the transmission grant for the backscatter link further comprises an indication of a transmission format for transmitting one or more reflected radio waves when the number of spatial streams is less than a number of antennas of the backscatter device.

6. The apparatus of claim 5, wherein the transmission format for transmitting the one or more reflected radio waves comprises a selection of one or more antennas of the backscatter device for generating one or more spatial streams.

7. The apparatus of claim 1, wherein the one or more processors are further configured to execute the computer-executable instructions and cause the network entity to:

receive, from the backscatter device, a plurality of reflected reference signals;

perform channel estimation based on the plurality of reflected reference signals; and determine, based on the plurality of reflected reference signals, a number of spatial streams on the backscatter link between the backscatter device and the network entity.

8. The apparatus of claim 1, wherein the one or more processors are further configured to execute the computer-executable instructions and cause the network entity to:

receive, from a user equipment, a plurality of reference signals;

receive, from the backscatter device, a plurality of reflected reference signals;

perform channel estimation based on the plurality of reference signals and the plurality of reflected reference signals; and determine, based on the plurality of reflected reference signals, a number of spatial streams on the backscatter link between the backscatter device and the network entity.

9. The apparatus of claim 1, wherein the one or more processors are further configured to execute the computer-executable instructions and cause the network entity to:

receive, from the backscatter device, one or more reflected radio waves using the determined number of spatial streams; and determine received data of the backscatter device based on the one or more reflected radio waves.

10. The apparatus of claim 1, wherein the one or more processors are further configured to execute the computer-executable instructions and cause the network entity to:

receive, from a user equipment, one or more radio waves;

receive, from the backscatter device, one or more reflected radio waves using the determined number of spatial streams; and determine received data of the backscatter device based on the one or more radio waves and the one or more reflected radio waves.

11. The apparatus of claim 10, wherein the radio waves comprise at least one of:

a reference signal;

a data signal; or a sine wave signal.

12. The apparatus of claim 1, wherein the one or more processors are further configured to execute the computer-executable instructions and cause the network entity to transmit, to a user equipment, a reference signal reception configuration.

13. The apparatus of claim 12, wherein the reference signal reception configuration comprises:

an indication that a plurality of reflected reference signals are for the backscatter link; and a reflection pattern for reflecting the plurality of reflected reference signals using a plurality of antennas.

14. The apparatus of claim 1, wherein the one or more processors are further configured to execute the computer-executable instructions and cause the network entity to transmit, to a user equipment and to a backscatter device, a plurality of reference signals.

15. The apparatus of claim 1, wherein the one or more processors are further configured to execute the computer-executable instructions and cause the network entity to receive, from a user equipment, a channel state information report regarding a backscatter link between the user equipment and the backscatter device.

16. The apparatus of claim 15, wherein the channel state information report regarding the backscatter link between the user equipment and the backscatter device comprises:

an indication of a number of spatial streams to be used on the backscatter link; and a mapping of one or more antennas of the backscatter device to each spatial stream of the number of spatial streams.

17. The apparatus of claim 15, wherein the one or more processors are further configured to execute the computer-executable instructions and cause the network entity to transmit, to the user equipment, a configuration for backscatter link reception.

18. The apparatus of claim 17, wherein the configuration for backscatter link reception comprises:

an indication of a number of spatial streams to be used on the backscatter link; and an indication of a transmission format for receiving one or more reflected radio waves when the number of spatial streams is less than a number of antennas of the backscatter device.

19. The apparatus of claim 18, wherein the transmission format for transmitting the one or more reflected radio waves comprises a selection of one or more antennas of the backscatter device for generating one or more spatial streams.

20. The apparatus of claim 12, wherein the one or more processors are further configured to execute the computer-executable instructions and cause the network entity to receive, from the user equipment, a report of received backscatter data.

21. An apparatus for wireless communications by a user equipment, comprising:

at least one memory comprising computer-executable instructions; and one or more processors configured to execute the computer-executable instructions and cause the user equipment to:

receive, from a backscatter device, a plurality of reflected reference signals;

perform channel estimation based on the plurality of reflected reference signals;

determine, based on the plurality of reflected reference signals, a number of spatial streams on the backscatter link between the backscatter device and the user equipment;

receive, from the backscatter device, one or more reflected radio waves using the determined number of spatial streams; and determine received data based on the one or more radio waves and the one or more reflected radio waves.

22. The apparatus of claim 21, wherein the one or more processors are configured to execute the computer-executable instructions and cause the user equipment to:

receive, from a network entity, a plurality of reference signals;

receive, from a backscatter device, a plurality of reflected reference signals;

perform channel estimation based on the plurality of reference signals and the plurality of reflected reference signals;

determine, based on the plurality of reflected reference signals, a number of spatial streams on the backscatter link between the backscatter device and the user equipment;

receive, from the network entity, one or more radio waves;

receive, from the backscatter device, one or more reflected radio waves using the determined number of spatial streams; and determine received data based on the one or more radio waves and the one or more reflected radio waves.

23. The apparatus of claim 21, wherein the radio waves comprise at least one of:

a reference signal;

a data signal; or a sine wave signal.

24. The apparatus of claim 21, wherein the one or more processors are further configured to execute the computer-executable instructions and cause the user equipment to receive, from a network entity, a reference signal reception configuration.

25. The apparatus of claim 24, wherein the reference signal reception configuration comprises:

an indication that the plurality of reflected reference signals are for the backscatter link; and a reflection pattern for the plurality of reflected reference signals.

26. The apparatus of claim 21, wherein the one or more processors are further configured to execute the computer-executable instructions and cause the user equipment to transmit, to a network entity, a channel state information report regarding a backscatter link between the user equipment and the backscatter device.

27. The apparatus of claim 26, the channel state information report regarding a backscatter link between the user equipment and the backscatter device comprises:

an indication of a number of spatial streams to be used on the backscatter link; and a mapping of one or more antennas of the backscatter device to each spatial stream of the number of spatial streams.

28. The apparatus of claim 21, wherein the one or more processors are further configured to execute the computer-executable instructions and cause the user equipment to receive, from a network entity, a configuration for backscatter link reception.

29. The apparatus of claim 28, wherein the configuration for backscatter link reception comprises:

an indication of the number of spatial streams to be used on the backscatter link; and an indication of a transmission format for receiving the one or more reflected radio waves when the number of spatial streams is less than a number of antennas of the backscatter device.

30. The apparatus of claim 29, wherein the transmission format for transmitting one or more reflected radio waves comprises the selection of one or more antennas of the backscatter device for one or more spatial streams.

31. The apparatus of claim 21, wherein the one or more processors are further configured to execute the computer-executable instructions and cause the user equipment to transmit, to a network entity, a report of received backscatter data.

32. An apparatus for wireless communications by a backscatter device, comprising:

at least one memory comprising computer-executable instructions; and one or more processors configured to execute the computer-executable instructions and cause the backscatter device to:

transmit, to a network entity, a spatial multiplexing capability report;

receive, from the network entity, a reference signal reflection configuration;

receive a plurality of reference signals; and transmit reflected reference signals by selectively modulating the reference signals according to the reference signal reflection configuration.

33. The apparatus of claim 32, wherein receiving the plurality of reference signals comprises receiving the plurality of reference signals from a user equipment.

34. The apparatus of claim 32, wherein receiving the plurality of reference signals comprises receiving the plurality of reference signals from the network entity.

35. The apparatus of claim 32, wherein transmitting the reflected reference signals by selectively modulating the reference signals, comprises:

selecting one or more antennas of the backscatter device according to the reference signal reflection configuration; and switching on or off the reflection of the selected one or more antennas according to the reference signal reflection configuration.

36. The apparatus of claim 33, wherein the one or more processors are further configured to execute the computer-executable instructions and cause the backscatter device to:

receive, from the network entity, a transmission grant for a backscatter link;

receive a plurality of radio waves; and transmit reflected radio waves by selectively modulating the radio waves according to the transmission grant for the backscatter link.

37. The apparatus of claim 36, wherein:

receiving the plurality of radio waves comprises receiving the plurality of radio waves from a user equipment, and transmitting the reflected radio waves comprises transmitting the reflected radio waves to the network entity.

38. The apparatus of claim 36, wherein:

receiving the plurality of radio waves comprises receiving the plurality of radio waves from the network entity, and transmitting the reflected radio waves comprises transmitting the reflected radio waves to a user equipment.

39. The apparatus of claim 36, wherein transmitting the reflected radio waves is performed using a plurality of antennas.

40. The apparatus of claim 36, wherein transmitting reflected radio waves by selectively modulating the radio waves, comprises:

selecting one or more antennas of the backscatter device for a spatial stream of one or more spatial streams according to the transmission grant for the backscatter link; and switching on or off the reflection of the selected one or more antennas according to the data of the spatial stream.

41. The apparatus of claim 36, wherein the radio waves comprise at least one of:

a reference signal;

a data signal; or a sine wave signal.

* * * * *